(12) United States Patent
Magnan et al.

(10) Patent No.: US 10,036,094 B2
(45) Date of Patent: Jul. 31, 2018

(54) PROCESSES AND SYSTEMS FOR PREPARING LITHIUM HYDROXIDE

(71) Applicant: NEMASKA LITHIUM INC., Québec (CA)

(72) Inventors: Jean-François Magnan, Neuville (CA); Guy Bourassa, Québec (CA); Gary Pearse, Ottawa (CA); Peter Symons, Williamsville, NY (US); David J. Genders, Elma, NY (US); Geneviève Clayton, Pierrefonds (CA)

(73) Assignee: Nemaska Lithium Inc., Québec (CA)

( * ) Notice: Subject to any disclaimer, the term of this patent is extended or adjusted under 35 U.S.C. 154(b) by 0 days.

(21) Appl. No.: 15/031,589

(22) PCT Filed: Oct. 23, 2014

(86) PCT No.: PCT/CA2014/000769
§ 371 (c)(1),
(2) Date: Apr. 22, 2016

(87) PCT Pub. No.: WO2015/058288
PCT Pub. Date: Apr. 30, 2015

(65) Prior Publication Data
US 2016/0258071 A1 Sep. 8, 2016

Related U.S. Application Data

(60) Provisional application No. 61/894,617, filed on Oct. 23, 2013.

(51) Int. Cl.
*C25B 1/16* (2006.01)
*C25B 9/08* (2006.01)
(Continued)

(52) U.S. Cl.
CPC .............. *C25B 1/16* (2013.01); *B01D 61/422* (2013.01); *C25B 9/08* (2013.01); *C25B 9/18* (2013.01); *B01D 2311/2684* (2013.01)

(58) Field of Classification Search
CPC .... C25B 1/16; C25B 9/08; C25B 9/18; B01D 61/42; B01D 61/422; B01D 2311/2648
See application file for complete search history.

(56) References Cited

U.S. PATENT DOCUMENTS 2,331,838 A 10/1943 Lindblad et al.
2,516,109 A 7/1950 Ellestad et al.
(Continued)

FOREIGN PATENT DOCUMENTS

AU 2012261548 1/2013
CA 504477 7/1954
(Continued)

OTHER PUBLICATIONS

English Abstract of KR20130092323(A), "Lithium compound recovering device, method for recovering lithium compound and lithium compound recovering system", published on Aug. 20, 2013.
(Continued)

*Primary Examiner* — Ciel P Thomas
(74) *Attorney, Agent, or Firm* — Bereskin & Parr LLP/S.E.N.C.R.L., s.r.l.

(57) ABSTRACT

There are provided processes for preparing lithium hydroxide. The processes comprise submitting an aqueous composition comprising lithium sulfate and/or lithium bisulfate to a first electromembrane process that comprises a two-compartment membrane process under suitable conditions for conversion of the lithium sulfate and/or lithium bisulfate to lithium hydroxide, and obtaining a first lithium-reduced aqueous stream and a first lithium hydroxide-enriched aqueous stream; and submitting the first lithium-reduced aqueous
(Continued)

stream to a second electromembrane process that comprises a three-compartment membrane process under suitable conditions to prepare at least a further portion of lithium hydroxide and obtaining a second lithium-reduced aqueous stream and a second lithium-hydroxide enriched aqueous stream. There are also provided systems for preparing lithium hydroxide.

21 Claims, 22 Drawing Sheets

(51) Int. Cl.
C25B 9/18 (2006.01)
B01D 61/42 (2006.01)

(56) References Cited

U.S. PATENT DOCUMENTS

| | | | |
|---|---|---|---|
| 2,872,393 | A | 2/1959 | Gardiner et al. |
| 3,007,771 | A | 11/1961 | Mazza et al. |
| 3,214,362 | A | 10/1965 | Juda |
| 3,597,340 | A | 8/1971 | Honeycutt et al. |
| 3,857,920 | A | 12/1974 | Grantham et al. |
| 3,899,403 | A * | 8/1975 | Cook, Jr. ............... C25B 1/26 205/345 |
| 3,905,879 | A * | 9/1975 | Eng .................... C25B 1/14 204/296 |
| 4,035,713 | A | 7/1977 | Kawamoto et al. |
| 4,036,713 | A | 7/1977 | Brown |
| 4,207,297 | A | 6/1980 | Brown et al. |
| 4,287,163 | A | 9/1981 | Garrett et al. |
| 4,391,680 | A | 7/1983 | Mani et al. |
| 4,561,945 | A | 12/1985 | Coker et al. |
| 4,707,234 | A | 11/1987 | Mori et al. |
| 4,723,962 | A | 2/1988 | Mehta |
| 4,806,215 | A * | 2/1989 | Twardowski ......... C01B 11/025 205/510 |
| 5,098,532 | A | 3/1992 | Thompson et al. |
| 5,129,936 | A | 7/1992 | Wilson |
| 5,198,081 | A | 3/1993 | Kanoh et al. |
| 5,227,031 | A | 7/1993 | Sundblad |
| 5,246,551 | A | 9/1993 | Pletcher et al. |
| 5,258,106 | A | 11/1993 | Habermann et al. |
| 5,423,959 | A * | 6/1995 | Sundblad ............ C25B 1/22 205/510 |
| 5,445,717 | A | 8/1995 | Karki et al. |
| 5,595,641 | A | 1/1997 | Traini et al. |
| 6,004,445 | A | 12/1999 | Genders et al. |
| 6,048,507 | A | 4/2000 | Amouzegar et al. |
| 6,331,236 | B1 | 12/2001 | Mani |
| 6,375,824 | B1 | 4/2002 | Phinney |
| 6,514,311 | B1 | 2/2003 | Lin et al. |
| 6,514,640 | B1 | 2/2003 | Armand et al. |
| 6,747,065 | B1 | 6/2004 | Paszkowski |
| 6,770,187 | B1 | 8/2004 | Putter et al. |
| 8,431,005 | B1 | 4/2013 | Zbranek et al. |
| 8,715,482 | B2 | 5/2014 | Amendola et al. |
| 9,255,011 | B2 | 2/2016 | Kawata et al. |
| 9,382,126 | B2 | 7/2016 | Bourassa et al. |
| 9,493,881 | B2 | 11/2016 | Kosmski et al. |
| 9,677,181 | B2 | 6/2017 | Bourassa et al. |
| 2001/0040093 | A1 | 11/2001 | Mani |
| 2005/0051488 | A1 | 3/2005 | Nagghappan et al. |
| 2011/0044882 | A1* | 2/2011 | Buckley ............... C01B 7/012 423/481 |
| 2011/0123427 | A1 | 5/2011 | Boryta et al. |
| 2011/0200508 | A1 | 8/2011 | Harrison et al. |
| 2011/0203929 | A1 | 8/2011 | Buckley et al. |
| 2012/0107210 | A1 | 5/2012 | Harrison et al. |
| 2014/0010743 | A1* | 1/2014 | Kosmoski ............ C25B 1/16 423/165 |
| 2015/0139886 | A1 | 5/2015 | Bourassa et al. |

FOREIGN PATENT DOCUMENTS

| | | |
|---|---|---|
| CA | 659894 | 3/1963 |
| CA | 1073847 | 3/1980 |
| CA | 1272982 | 8/1990 |
| CA | 2205199 | 1/1997 |
| CA | 2205493 | 1/1997 |
| CA | 2786317 | 7/2011 |
| CA | 2796849 | 10/2011 |
| CA | 2820112 | 6/2012 |
| GB | 530028 | 12/1940 |
| GB | 841989 | 7/1960 |
| GB | 845511 | 8/1960 |
| WO | 9859385 | 12/1998 |
| WO | 2010056322 | 5/2010 |
| WO | 2011133165 | 10/2011 |
| WO | 2013159194 | 10/2013 |
| WO | 2014138933 | 9/2014 |
| WO | 2015058287 | 4/2015 |
| WO | 2015123762 | 8/2015 |

OTHER PUBLICATIONS

English Abstract, "Lithium Hydroxide Purified Grade", China Lithium Products Tech. Co., Ltd., published on Jun. 6, 2011.
English Abstract, "Extraction, Properties and Use of Lithium", Scribd, published on Feb. 2, 2009.
English Abstract of Sun et al., "Preparation of Li2CO3 by Gas-Liquid Reactive Crystallization of LiOH and CO2", published on Jan. 31, 2012.
English Abstract of CN102030346(A), "Preparation method for lithium carbonate", published on Apr. 27, 2011.
English Abstract of JP62161973(A), "Production of High-Purity Lithium Carbonate", published on Jul. 17, 1987.
English Abstract of JP2004196606(A), "Method for manufacturing high purity lithium carbonate", published on Jul. 15, 2004.
English Abstract of JP2004196607(A), "Method for manufacturing high purity lithium carbonate", published on Jul. 15, 2004.
English Abstract of JP2009046390(A), "Production of high purity lithium carbonate", published on Mar. 5, 2009.
English Abstract of JP2009057278(A), "Method of manufacturing high purity lithium carbonate", published on Mar. 19, 2009.
English Abstract of JP2009270188(A), "Method of manufacturing high-purity lithium hydroxide", published on Nov. 19, 2009.
English Abstract of JP2009270189(A), "Method of manufacturing high-purity lithium hydroxide", published on Nov. 19, 2009.
English Abstract of JP2010029797(A), "Lithium isotope separation and condensation method, apparatus, measure, lithium ion selective permeation membrane, and lithium isotope concentrate", published on Feb. 12, 2010.
English Abstract of JP2011031232(A), "Method of manufacturing lithium hydroxide", published on Feb. 17, 2011.
English Abstract of JPS5443174(A), "Preparation of lithium hydroxide", published on Apr. 5, 1979.
Koter et al., "Electromembrane Processes in Environment Protection", Polish Journal of Environmental Studies vol. 9, No. 1 (2000), 45-56.
Walesh, S.G. (Feb. 21, 1989) Sedimentation Basin Design, in Urban Surface Water Management, pp. 297-313, John Wiley & Sons, Inc., Hoboken, NJ, USA, DOI: 10.002/9780470172810.
Tongwen Xu, "Ion exchange membranes: State of their development and perspective", Journal of Membrane Science 263 (2005) 1-29.
John Jacco Krol, "Monopolar and Bipolar Ion Exchange Membranes", Mass Transport Limitations, published on Aug. 25, 1969.
Ryabtsev et al., "Preparation of High-Purity Lithium Hydroxide Monohydrate from Technical-Grade Lithium Carbonate by Membrane Electrolysis", Russian Journal of Applied Chemistry, vol. 77, No. 7, 2004, pp. 1108-1116. (The year of publication is sufficiently earlier than the effective U.S. filing date so that the particular month of publication is not issue).
English Abstract of JPWO2013153692(A1), "Method for collecting lithium", published on Dec. 17, 2015.
English Abstract of CL2012002968 (A1), "Method for the preparation of lithium carbonate from brines containing lithium chloride which comprises contacting the salt with sodium hydroxide and then contacting with carbon dioxide", published on Jan. 11, 2013.

* cited by examiner

PROCESSES AND SYSTEMS FOR PREPARING LITHIUM HYDROXIDE

The present application is a 35 USC 371 national stage entry of PCT/CA2014/000769 filed on Oct. 23, 2014 and which claims priority from U.S. provisional application no. 61/894,617 filed on Oct. 23, 2013. These documents are hereby incorporated by reference in their entirety.

The present disclosure relates to processes and systems for preparing lithium hydroxide. For example, it relates to processes and systems that are effective for preparing lithium hydroxide by using an electrochemical process.

Processes for preparing lithium hydroxide using a three-compartment membrane electrolysis cell are known. However, processes using a three-compartment cell may, for example require a cell having a higher surface area which may, for example lead to higher costs in the production of lithium hydroxide, due to, for example the cost of the cells having a higher surface area and/or the cost for the membranes used in the cells. A cell having a higher surface can also, for example takes up more space in a plant and/or the plant would require more cells.

Therefore according to an aspect of the present disclosure, there is provided a process for preparing lithium hydroxide, the process comprising:
  submitting an aqueous composition comprising a lithium compound to a first electromembrane process under suitable conditions for conversion of the lithium compound to lithium hydroxide, and obtaining a first lithium-reduced aqueous stream and a first lithium hydroxide-enriched aqueous stream; and
  submitting the first lithium-reduced aqueous stream to a second electromembrane process under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:
  submitting an aqueous composition comprising a lithium compound to a first electromembrane process under suitable conditions for conversion of the lithium compound to lithium hydroxide to proceed to a pre-determined extent, and obtaining a first lithium-reduced aqueous stream and a first lithium hydroxide-enriched aqueous stream; and
  submitting the first lithium-reduced aqueous stream to a second electromembrane process under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:
  submitting an aqueous composition comprising lithium sulfate and/or lithium bisulfate to a first electromembrane process under suitable conditions for conversion of the lithium sulfate and/or lithium bisulfate to lithium hydroxide, and obtaining a first lithium-reduced aqueous stream and a first lithium hydroxide-enriched aqueous stream; and
  submitting the first lithium-reduced aqueous stream to a second electromembrane process under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:
  submitting an aqueous composition comprising lithium sulfate and/or lithium bisulfate to a first electromembrane process under suitable conditions for conversion of the lithium sulfate and/or lithium bisulfate to lithium hydroxide to proceed to a pre-determined extent, and obtaining a first lithium-reduced aqueous stream and a first lithium hydroxide-enriched aqueous stream; and
  submitting the first lithium-reduced aqueous stream to a second electromembrane process under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:
  submitting an aqueous composition comprising lithium sulfate and/or lithium bisulfate to a first electromembrane process that comprises a two-compartment membrane process under suitable conditions for conversion of the lithium sulfate and/or lithium bisulfate to lithium hydroxide, and obtaining a first lithium-reduced aqueous stream and a first lithium hydroxide-enriched aqueous stream; and
  submitting the first lithium-reduced aqueous stream to a second electromembrane process that comprises a three-compartment membrane process under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:
  submitting an aqueous composition comprising lithium sulfate and/or lithium bisulfate to a first electromembrane process that comprises a two-compartment membrane process under suitable conditions for conversion of the lithium sulfate and/or lithium bisulfate to lithium hydroxide to proceed to a pre-determined extent, and obtaining a first lithium-reduced aqueous stream and a first lithium hydroxide-enriched aqueous stream; and
  submitting the first lithium-reduced aqueous stream to a second electromembrane process that comprises a three-compartment membrane process under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:
  submitting an aqueous composition comprising a lithium compound to a two-compartment monopolar or bipolar membrane electrolysis process carried out in a first electrochemical cell comprising an anolyte compartment separated from a catholyte compartment by a cation exchange membrane under suitable conditions for conversion of the lithium compound to lithium hydroxide, and obtaining a first lithium-reduced aqueous stream and a first lithium hydroxide-enriched aqueous stream; and
  submitting the first lithium-reduced aqueous stream to a three-compartment monopolar or bipolar membrane electrolysis process carried out in a second electrochemical cell comprising an anolyte compartment separated from a central compartment by an anion exchange membrane and a catholyte compartment separated from the central compartment by a cation exchange membrane under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:

submitting an aqueous composition comprising lithium sulfate and/or lithium bisulfate to a two-compartment monopolar or bipolar membrane electrolysis process carried out in a first electrochemical cell comprising an anolyte compartment separated from a catholyte compartment by a cation exchange membrane under suitable conditions for conversion of the lithium sulfate and/or lithium bisulfate to lithium hydroxide, and obtaining a first lithium-reduced aqueous stream and a first lithium hydroxide-enriched aqueous stream; and submitting the first lithium-reduced aqueous stream to a three-compartment monopolar or bipolar membrane electrolysis process carried out in a second electrochemical cell comprising an anolyte compartment separated from a central compartment by an anion exchange membrane and a catholyte compartment separated from the central compartment by a cation exchange membrane under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:

submitting an aqueous composition comprising a lithium compound to a two-compartment monopolar or bipolar membrane electrolysis process carried out in a first electrochemical cell comprising an anolyte compartment separated from a catholyte compartment by a cation exchange membrane under suitable conditions for conversion of the lithium compound to lithium hydroxide to proceed to a pre-determined extent, and obtaining a first lithium-reduced aqueous stream and a first lithium hydroxide-enriched aqueous stream; and submitting the first lithium-reduced aqueous stream to a three-compartment monopolar or bipolar membrane electrolysis process carried out in a second electrochemical cell comprising an anolyte compartment separated from a central compartment by an anion exchange membrane and a catholyte compartment separated from the central compartment by a cation exchange membrane under suitable conditions to prepare at least a further portion of lithium hydroxide and obtaining a second lithium-reduced aqueous stream and a second lithium-hydroxide enriched aqueous stream.

The present disclosure also includes a process for preparing lithium hydroxide, the process comprising:

submitting an aqueous composition comprising lithium sulfate and/or lithium bisulfate to a two-compartment monopolar or bipolar membrane electrolysis process carried out in a first electrochemical cell comprising an anolyte compartment separated from a catholyte compartment by a cation exchange membrane under suitable conditions for conversion of the lithium sulfate and/or lithium bisulfate to lithium hydroxide to proceed to a pre-determined extent, and obtaining a first lithium-reduced aqueous stream and a first lithium hydroxide-enriched aqueous stream; and submitting the first lithium-reduced aqueous stream to a three-compartment monopolar or bipolar membrane electrolysis process carried out in a second electrochemical cell comprising an anolyte compartment separated from a central compartment by an anion exchange membrane and a catholyte compartment separated from the central compartment by a cation exchange membrane under suitable conditions to prepare at least a further portion of lithium hydroxide and obtaining a second lithium-reduced aqueous stream and a second lithium-hydroxide enriched aqueous stream.

The present disclosure also includes a system for preparing lithium hydroxide, the system comprising:

a first electrochemical cell effective for submitting an aqueous composition comprising lithium sulfate and/or lithium bisulfate to a two-compartment monopolar or bipolar membrane electrolysis process under suitable conditions for converting of the lithium sulfate and/or lithium bisulfate into lithium hydroxide to obtain a first lithium-reduced aqueous stream and a first lithium hydroxide-enriched aqueous stream, the first electrochemical cell defining an anolyte compartment separated from a catholyte compartment by a cation exchange membrane, the anolyte compartment comprising at least one anode and being dimensioned to receive first lithium-reduced aqueous stream and the catholyte compartment comprising at least one cathode and being dimensioned to receive the first lithium hydroxide-enriched aqueous stream;

a second electrochemical cell effective for submitting the first lithium-reduced aqueous stream to a three-compartment monopolar or bipolar membrane electrolysis process under suitable conditions for converting of the lithium sulfate and/or lithium bisulfate contained in the first lithium-reduced aqueous stream into lithium hydroxide to obtain a second lithium-reduced aqueous stream and a second lithium-hydroxide enriched aqueous stream, the second electrochemical cell defining an anolyte compartment separated from a central compartment by an anion exchange membrane and a catholyte compartment separated from the central compartment by a cation exchange membrane, the anolyte compartment comprising at least one anode and being dimensioned to receive the second lithium-reduced aqueous stream and the catholyte compartment comprising at least one cathode and being dimensioned to receive the second lithium hydroxide-enriched aqueous stream; and means for conveying the first lithium-reduced aqueous stream from the anolyte compartment of the first electrochemical cell to the central compartment of the second electrochemical cell.

The present disclosure also includes a system for preparing lithium hydroxide, the system comprising:

a two-compartment monopolar or bipolar membrane electrolysis cell for receiving and converting lithium sulfate and/or lithium bisulfate into lithium hydroxide, the cell comprising an anolyte compartment separated from a catholyte compartment by an cation exchange membrane, the anolyte compartment comprising at least one anode and at least one pH meter and the catholyte compartment comprising at least one cathode;

a three-compartment monopolar or bipolar membrane electrolysis cell for receiving and converting of lithium sulfate and/or lithium bisulfate into lithium hydroxide, the cell comprising an anolyte compartment separated from a central compartment by an anion exchange membrane and a catholyte compartment separated from the central compartment by an cation exchange membrane, the central compartment comprises at least one pH meter the anolyte compartment comprising at least one anode and the catholyte compartment comprising at least one cathode; and the anolyte compartment of the first electrochemical cell and the central compartment of the second electrochemical cell being in fluid flow communication with one another for conveying lithium sulfate and/or lithium bisulfate from the anolyte compartment of the first electrochemical cell to the central compartment of the second electrochemical cell when pH in the anolyte compartment is below a pre-determined value, and for conveying lithium sulfate and/or lithium bisulfate from the central compartment of the second electrochemical cell to the anolyte compartment of the first electrochemical cell when pH in the central compartment of the second electrochemical cell is above a pre-determined value.

The present disclosure also includes a system for preparing lithium hydroxide, the system comprising:

a first electrochemical cell effective for submitting an aqueous composition comprising lithium sulfate and/or lithium bisulfate to an electromembrane process under suitable conditions for converting of the lithium sulfate and/or lithium bisulfate into lithium hydroxide to obtain a first lithium-reduced aqueous stream and a first lithium hydroxide-enriched aqueous stream, the first electrochemical cell defining an anolyte compartment separated from a catholyte compartment by a cation exchange membrane, the anolyte compartment comprising at least one anode and being dimensioned to receive first lithium-reduced aqueous stream and the catholyte compartment comprising at least one cathode and being dimensioned to receive the first lithium hydroxide-enriched aqueous stream;

a second electrochemical cell effective for submitting the first lithium-reduced aqueous stream to an electromembrane process under suitable conditions for converting of the lithium sulfate and/or lithium bisulfate contained in the first lithium-reduced aqueous stream into lithium hydroxide to obtain a second lithium-reduced aqueous stream and a second lithium-hydroxide enriched aqueous stream, the second electrochemical cell defining an anolyte compartment separated from a central compartment by an anion exchange membrane and a catholyte compartment separated from the central compartment by a cation exchange membrane, the anolyte compartment comprising at least one anode and being dimensioned to receive the second lithium-reduced aqueous stream and the catholyte compartment comprising at least one cathode and being dimensioned to receive the second lithium hydroxide-enriched aqueous stream; and means for conveying the first lithium-reduced aqueous stream from the anolyte compartment of the first electrochemical cell to the central compartment of the second electrochemical cell.

The present disclosure also includes a system for preparing lithium hydroxide, the system comprising:

an electromembrane process cell for receiving and converting lithium sulfate and/or lithium bisulfate into lithium hydroxide, the cell comprising an anolyte compartment separated from a catholyte compartment by an cation exchange membrane, the anolyte compartment comprising at least one anode and at least one pH meter and the catholyte compartment comprising at least one cathode;

an electromembrane process cell for receiving and converting of lithium sulfate and/or lithium bisulfate into lithium hydroxide, the cell comprising an anolyte compartment separated from a central compartment by an anion exchange membrane and a catholyte compartment separated from the central compartment by an cation exchange membrane, the central compartment comprises at least one pH meter the anolyte compartment comprising at least one anode and the catholyte compartment comprising at least one cathode; and the anolyte compartment of the first electrochemical cell and the central compartment of the second electrochemical cell being in fluid flow communication with one another for conveying lithium sulfate and/or lithium bisulfate from the anolyte compartment of the first electrochemical cell to the central compartment of the second electrochemical cell when pH in the anolyte compartment is below a pre-determined value, and for conveying lithium sulfate and/or lithium bisulfate from the central compartment of the second electrochemical cell to the anolyte compartment of the first electrochemical cell when pH in the central compartment of the second electrochemical cell is above a pre-determined value.

In the following drawings, which represent by way of example only, various embodiments of the disclosure:

Figure 1:
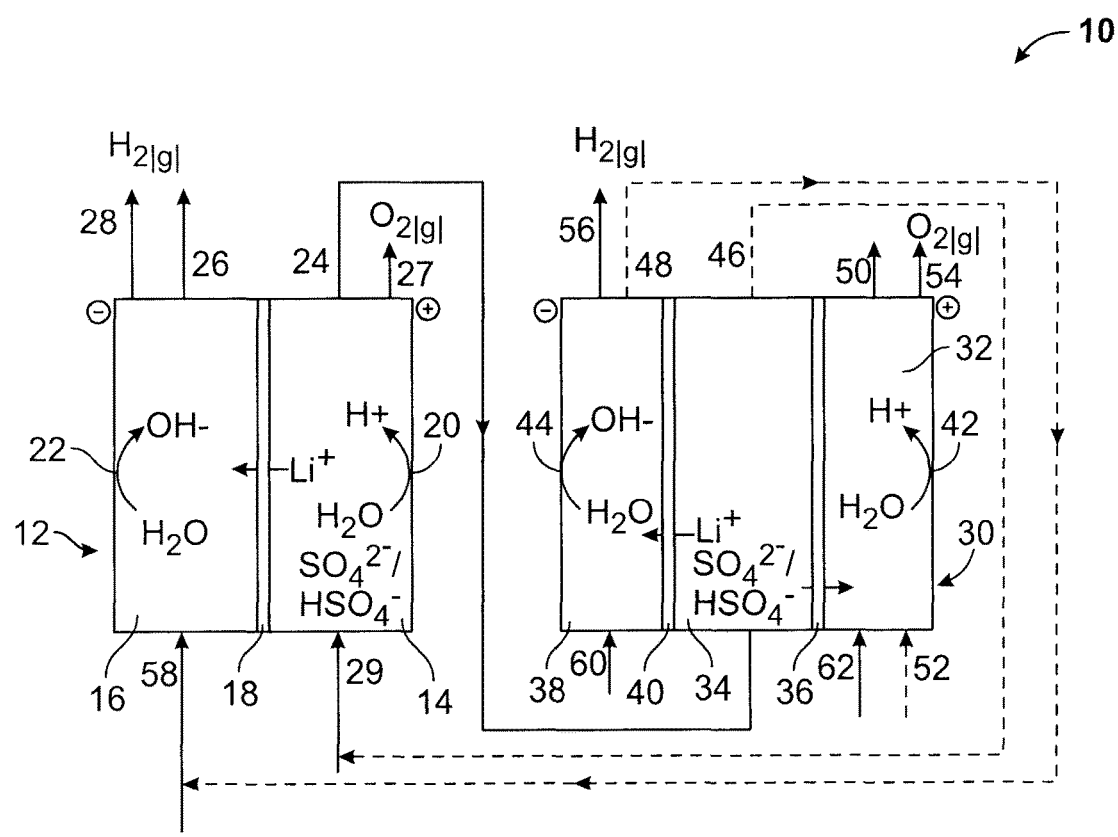
FIG. 1 is a schematic diagram of a process and a system according to an embodiment of the present disclosure.

FIG. 3 shows plots relating to an example of a process for preparing lithium hydroxide using a Nafion 324 cation exchange membrane in a two-compartment membrane electrolysis cell at a temperature of about 80° C. and a current density of about 3 kA/m$^2$: FIG. 3A is a plot showing feed concentration for various ions and percent conversion as a function of charge passed, FIG. 3B is a plot showing current efficiency, percent conversion, ratio and feed pH as a function of charge passed, FIG. 3C is a plot showing voltage and current density as a function of charge passed, and FIG. 3D is a plot showing the hydroxide concentration as a function of charge passed;

FIG. 4 shows plots relating to an example of a process for preparing lithium hydroxide using a Nafion 324 cation exchange membrane in a two-compartment membrane electrolysis cell at a temperature of about 80° C. and a current density of about 4 kA/m$^2$: FIG. 4A is a plot showing voltage and current density as a function of charge passed, FIG. 4B is a plot showing the feed concentration of various ions as a function of charge passed, FIG. 4C is a plot showing the current efficiency, percent conversion and ratio as a function of charge passed, and FIG. 4D is a plot showing the hydroxide concentration as a function of charge passed;

FIG. 5 shows plots relating to an example of a process for preparing lithium hydroxide using a Nafion 324 cation exchange membrane in a two-compartment membrane electrolysis cell at a temperature of about 80° C. and a current density of about 5 kA/m$^2$: FIG. 5A is a plot showing voltage and current density as a function of charge passed, FIG. 5B is a plot showing the feed concentration and ratio of various ions as a function of charge passed, FIG. 5C is a plot showing the current efficiency, percent conversion and ratio as a function of charge passed, and FIG. 5D is a plot showing the hydroxide concentration as a function of charge passed;

FIG. 6 shows plots relating to an example of a process for preparing lithium hydroxide coproducing ammonium sulfate using a Nafion 324 cation exchange membrane and an Astom AHA anion exchange membrane in a three-compartment membrane electrolysis cell at a temperature of about 80° C. and a current density of about 200 mA/cm$^2$: FIG. 6A is a plot showing concentrations of various ions in various compartments of the three-compartment membrane electrolysis cell as a function of charge passed, FIG. 6B is a plot showing current density, cell voltage and feed and acid pH as a function of charge passed, FIG. 6C is a plot showing current efficiencies and ratio of various compartments of the three-compartment membrane electrolysis cell as a function of charge passed, and FIG. 6D is a plot showing voltage and current density as a function of charge passed; and FIG. 7 shows plots relating to an example of a process for preparing lithium hydroxide coproducing sulfuric acid using a Nafion 324 cation exchange membrane and a Fumatech FAB anion exchange membrane in a three-compartment membrane electrolysis cell at a temperature of about 60° C. and a current density of about 100 mA/cm$^2$: FIG. 7A is a plot showing concentrations in various compartments of the three-compartment membrane electrolysis cell as a function of charge passed, FIG. 7B is a plot showing current efficiencies and ratio of various compartments of the three-compartment membrane electrolysis cell as a function of charge passed, FIG. 7C is a plot showing current density, charge passed and feed pH as a function of charge passed, and FIG. 7D is a plot showing voltage and current density as a function of charge passed.

Unless otherwise indicated, the definitions and embodiments described in this and other sections are intended to be applicable to all embodiments and aspects of the present disclosure herein described for which they are suitable as would be understood by a person skilled in the art.

As used in the present disclosure, the singular forms "a", "an" and "the" include plural references unless the content clearly dictates otherwise. For example, an embodiment including "a lithium compound" should be understood to present certain aspects with one lithium compound, or two or more additional lithium compounds.

In embodiments comprising an "additional" or "second" component, such as an additional or second lithium compound, the second component as used herein is different from the other components or first component. A "third" component is different from the other, first, and second components, and further enumerated or "additional" components are similarly different.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The term "suitable" as used herein means that the selection of the particular conditions would depend on the specific manipulation or operation to be performed, but the selection would be well within the skill of a person trained in the art. All processes described herein are to be conducted under conditions sufficient to provide the desired product. A person skilled in the art would understand that all reaction conditions, including, when applicable, for example, reaction time, reaction temperature, reaction pressure, reactant ratio, flow rate, reactant purity, current density, voltage, concentration, pH, oxidation reduction potential, cell area, type of membrane used, and recycle rates can be varied to optimize the yield of the desired product and it is within their skill to do so.

The expression "is at least substantially maintained" as used herein when referring to a value of a pH or a pH range that is maintained during a process of the disclosure or a portion thereof (for example, electrolysis, etc.) refers to maintaining the value of the pH or the pH range at least 75, 80, 85, 90, 95, 96, 97, 98 or 99% of the time during the process or the portion thereof.

The expression "is at least substantially maintained" as used herein when referring to a value of a concentration or a concentration range that is maintained during a process of the disclosure or a portion thereof (for example, electrolysis, etc.) refers to maintaining the value of the concentration or the concentration range at least 75, 80, 85, 90, 95, 96, 97, 98 or 99% of the time during the process or the portion thereof.

The expression "is at least substantially maintained" as used herein when referring to a value of a temperature or a temperature range that is maintained during a process of the disclosure or a portion thereof (for example, electrolysis, etc.) refers to maintaining the value of the temperature or the temperature range at least 75, 80, 85, 90, 95, 96, 97, 98 or 99% of the time during the process or the portion thereof.

The expression "is at least substantially maintained" as used herein when referring to a value of an electrical current density or an electrical current density range that is maintained during a process of the disclosure or a portion thereof (for example, electrolysis, etc.) refers to maintaining the value of the electrical current density or the electrical current density range at least 75, 80, 85, 90, 95, 96, 97, 98 or 99% of the time during the process or the portion thereof.

The expression "is at least substantially maintained" as used herein when referring to a value of an electrical current efficiency or an electrical current efficiency range that is maintained during a process of the disclosure or a portion thereof (for example, electrolysis, etc.) refers to maintaining the value of the electrical current efficiency or the electrical current efficiency range at least 75, 80, 85, 90, 95, 96, 97, 98 or 99% of the time during the process or the portion thereof.

The expression "is at least substantially maintained" as used herein when referring to a value of a voltage or a voltage range that is maintained during a process of the disclosure or a portion thereof (for example, electrolysis, etc.) refers to maintaining the value of the voltage or the voltage range at least 75, 80, 85, 90, 95, 96, 97, 98 or 99% of the time during the process or the portion thereof.

The term "electromembrane process" as used herein refers, for example to a process that uses ion-exchange membrane(s) and an electric potential difference as the driving force for ionic species. The electromembrane process can be, for example (a membrane) electrodialysis or (a membrane) electrolysis. For example, the electromembrane process can be a membrane electrolysis.

An exemplary flow diagram for the process of the present disclosure is shown in FIG. 1. The process 10 exemplified therein is for preparing lithium hydroxide. Referring to FIG. 1, in the process exemplified therein, an aqueous composition comprising a lithium compound such as lithium sulfate and/or lithium bisulfate is submitted to a first electromembrane process, for example a first electromembrane process that comprises a two-compartment membrane process such as a two-compartment monopolar membrane electrolysis process under suitable conditions for consumption of the lithium compound such as lithium sulfate and/or lithium bisulfate to prepare lithium hydroxide, optionally wherein the consumption of the lithium compound such as lithium sulfate and/or lithium bisulfate to prepare lithium hydroxide proceeds to a pre-determined extent. Referring to FIG. 1, the two-compartment membrane process such as a two-compartment monopolar membrane electrolysis process can be carried out in a first electrochemical cell 12 comprising an anolyte compartment 14 separated from a catholyte compartment 16 by a membrane such as a cation exchange membrane 18.

It will be appreciated that the term "consumption" as used herein in respect of a lithium compound such as lithium sulfate and/or lithium bisulfate refers to a reduction in the amount of the lithium compound such as lithium sulfate and/or lithium bisulfate present in the aqueous composition. For example, a person skilled in the art would readily understand that during a two-compartment monopolar membrane electrolysis process such as that shown in FIG. 1, water ($H_2O$) can be converted into proton ($H^+$) and oxygen gas ($O_2$) at an anode 20, water can be converted into hydroxide ion ($OH^-$) and hydrogen gas ($H_2$) at a cathode 22 and lithium ions ($Li^+$) initially present in the aqueous composition comprising a lithium compound such as lithium sulfate and/or lithium bisulfate can be driven by an electric potential difference from the anolyte compartment 14 across the membrane such as a cation exchange membrane 18 into the catholyte compartment 16. A first lithium-reduced aqueous stream 24 and a first lithium hydroxide-enriched aqueous stream 26 are thereby obtained which, as shown in FIG. 1, can be removed from the anolyte compartment 14 and catholyte compartment 16, respectively, of the first electrochemical cell 12. The $Li^+$ ions migrate through membrane 18 in view of the electrical current, thereby converting $Li_2SO_4$ into LiOH.

A first oxygen-containing stream 27 and a first hydrogen-containing stream 28 can also be obtained, which, as shown in FIG. 1, can be removed from the anolyte compartment 14 and catholyte compartment 16, respectively, of the first electrochemical cell 12. Alternatively, the oxygen and/or hydrogen gas produced as a product of the electrolysis reactions can also, for example remain in an aqueous solution and be removed from the anolyte compartment 14 and catholyte compartment 16, respectively, of the first electrochemical cell 12 as a component of the first lithium-reduced aqueous stream 24 and the first lithium hydroxide-enriched aqueous stream 26, respectively.

As shown in FIG. 1, an aqueous stream 29 comprising a lithium compound such as lithium sulfate and/or lithium bisulfate can be used to introduce the lithium compound such as lithium sulfate and/or lithium bisulfate into the anolyte compartment 14 of the first electrochemical cell 12.

As shown in FIG. 1, the first lithium-reduced aqueous stream 24 can then be submitted to a second electromembrane process, for example a second electromembrane process that comprises a three-compartment membrane process such as a three-compartment membrane electrolysis process under suitable conditions to prepare at least a further portion of lithium hydroxide. As shown in FIG. 1, the three-compartment membrane process such as a three-compartment membrane electrolysis process can be carried out in a second electrochemical cell 30 comprising an anolyte compartment 32 separated from a central compartment 34 by a membrane such as an anion exchange membrane 36 and a catholyte compartment 38 separated from the central compartment 34 by a membrane such as a cation exchange membrane 40.

For example, a person skilled in the art would readily understand that during a three-compartment monopolar membrane electrolysis process such as that shown in FIG. 1, water ($H_2O$) can be converted into proton ($H^+$) and oxygen gas ($O_2$) at an anode 42, water can be converted into hydroxide ion ($OH^-$) and hydrogen gas ($H_2$) at a cathode 44, lithium ions ($Li^+$) initially present in the first lithium-reduced aqueous stream 24 can be driven by an electric potential difference from the central compartment 34 across the membrane such as a cation exchange membrane 40 into the catholyte compartment 38 and sulfate ions ($SO_4^{2-}$) initially present in the first lithium-reduced aqueous stream 24 can be driven by an electric potential difference from the central compartment 34 across the membrane such as an anion exchange membrane 36 into the anolyte compartment 32. A second lithium-reduced aqueous stream 46 and a second lithium hydroxide-enriched aqueous stream 48 are thereby obtained which, as shown in FIG. 1, can be removed from the central compartment 34 and catholyte compartment 38, respectively, of the second electrochemical cell 30. In fact, the second lithium-reduced aqueous stream 46 can be conveyed into the the anolyte compartment 14, while the second lithium hydroxide-enriched aqueous stream 48 can be conveyed into the catholyte compartment 16.

As shown in FIG. 1, during the three-compartment monopolar membrane electrolysis process, the first lithium-reduced aqueous stream can be introduced into the central compartment 34 of the second electrochemical cell 30, the second lithium-reduced aqueous stream 46 can be removed from the central compartment 34 of the second electrochemical cell 30 and the second lithium hydroxide-enriched aqueous stream 48 can be removed from the catholyte compartment 38 of the second electrochemical cell 30.

In the processes of the present disclosure, the three-compartment monopolar membrane electrolysis process can further comprise producing sulfuric acid in the anolyte compartment 32. As shown in FIG. 1, stream 50 that is a sulfuric acid-containing aqueous stream can thus be removed from the anolyte compartment 32 of the second electrochemical cell 30.

Alternatively, the three compartment monopolar membrane electrolysis process can further comprise introducing ammonia into the anolyte compartment 32 of the second electrochemical cell 30, for example via stream 52 and producing ammonium sulfate in the anolyte compartment 32 of the second electrochemical cell 30. As shown in FIG. 1, stream 50 that is an ammonium sulfate-containing aqueous stream can thus be removed from the anolyte compartment 32 of the second electrochemical cell 30.

A second oxygen-containing stream 54 and a second hydrogen-containing stream 56 can also be obtained, which, as shown in FIG. 1, can be removed from the anolyte compartment 32 and catholyte compartment 38, respectively, of the second electrochemical cell 30. Alternatively, the oxygen and/or hydrogen gas produced as a product of the electrolysis reactions can also, for example remain in an aqueous solution and be removed from the anolyte compartment 32 and catholyte compartment 38, respectively, of the second electrochemical cell 30 as a component of stream 50 and the second lithium hydroxide-enriched aqueous stream 48, respectively.

It will be appreciated by a person skilled in the art that other streams such as stream 58, stream 60 and stream 62 can be used, for example to introduce other reagents and/or solvents into the catholyte compartment 16 of the first electrochemical cell 12, the catholyte compartment 38 of the second electrochemical cell 30 and/or the anolyte compartment 62 of the second electrochemical cell 30. For example, such streams may be used to add acid (for example $H_2SO_4$) and/or base (for example LiOH), for example to maintain or change a pH; and/or water, for example to maintain or change a concentration in a compartment of the electrochemical cells 12,30 of the process 10. It will also be appreciated by a person skilled in the art that such reagents and/or solvents may also be introduced into various compartments of the electrochemical cells 12,30 shown in FIG. 1 as a component of other streams either shown or not shown in FIG. 1 so as to maintain or change a parameter such as pH and/or concentration of the reactants (such as $Li_2SO4$, LiHSO4, LiOH, $NH_3$, $NH_4HSO_4$, $(NH_4)_2SO_4$) in a compartment of the electrochemical cells 12,30.

As shown in FIG. 1, the processes of the present disclosure can further comprise recycling at least a portion of the second lithium-reduced aqueous stream 46 to the first electromembrane process. For example, as shown in FIG. 1, the second lithium-reduced aqueous stream 46 can be introduced into the anolyte compartment 14 of the first electrochemical cell 12. For example, the at least a portion of the second lithium-reduced aqueous stream 46 can be passed from the second electrochemical cell 30 to the first electrochemical cell 12 via a suitable conduit by means of a pump.

As shown in FIG. 1, the processes of the present disclosure can also further comprise recycling at least a portion of the second lithium hydroxide-enriched aqueous stream 48 to the first electromembrane process. For example, as shown in FIG. 1, at least a portion of the second lithium hydroxide-enriched aqueous stream 48 can be introduced into the catholyte compartment 16 of the first electrochemical cell 12 as a component of stream 58. It will be appreciated by a person skilled in the art that alternative ways of introducing the at least a portion of the second lithium hydroxide-enriched aqueous stream 48 into the catholyte compartment 16 of the first electrochemical cell 12 are possible. For example, the at least a portion of the second lithium hydroxide-enriched aqueous stream 48 can be introduced as a separate stream into the catholyte compartment 16. For example, the at least a portion of the second lithium hydroxide-enriched aqueous stream 48 can be conveyed from the second electrochemical cell 30 to the first electrochemical cell 12 via a suitable conduit by means of a pump.

For example, when the electrolysis of $Li_2SO_4$ and/or $LiHSO_4$ in cell 12 has reached a certain predetermined extent in terms of consumption of $Li_2SO_4$ and/or $LiHSO_4$ (for example observed by a drop of current efficiency) or when the pH of the anolyte in the anolyte compartment 14 (for example pH measured by means of a pH meter) is below a predetermined value, the content of the anolyte compartment 14 (stream 24) can be conveyed to the central compartment 34 of the cell 30. It was observed that in cell 12, the pH in the anolyte compartment 14 can have tendency to decrease and thus, when the reaction is less efficient or no longer efficient, the stream 24 is transferred into the compartment 34 in which the pH can have tendency to increase until a certain point is reached at which the electrolysis is less efficient or no longer efficient. In such a case, the stream 46 can be conveyed into the compartment 14 in which the pH will be decreased. Transfers of $Li_2SO_4$ and/or $LiHSO_4$ between the compartments 14 and 34 can be made by the same conveying means or different one. Such means can be a conduit combined with a pump. The person skilled in the art would understand that in the processes of the present disclosure, depending on the pH of the starting solution (or feed solution) (for example aqueous solution of $Li_2SO_4$ and/or $LiHSO_4$), the starting solution can be treated first in the two-compartment monopolar or bipolar membrane electrolysis process cell (for example if pH is neutral or basic) and then in the three-compartment monopolar or bipolar membrane electrolysis process. Alternatively, the starting solution can be treated first in the three-compartment monopolar or bipolar membrane electrolysis process cell (for example if pH is neutral or acidic) and then in the two-compartment monopolar or bipolar membrane electrolysis process cell.

When a certain concentration of LiOH is reached in the compartment 38, the stream 48 can be conveyed to the compartment 16 in which LiOH can be further concentrated.

The processes of the present disclosure can be operated, for example as a batch process. Alternatively, the processes of the present disclosure can be operated as a semi-continuous process or a continuous process.

It will be appreciated by a person skilled in the art that one or more parameters of the processes of the present disclosure such as but not limited to pH, temperature, current density, voltage, current efficiency and concentration can be monitored, for example by means known in the art. The selection of a suitable means for monitoring a particular parameter in a process of the present disclosure can be made by a person skilled in the art. Such parameters can also be maintained and/or changed by a person skilled in the art, for example in light of their common general knowledge and with reference to the present disclosure.

The below presented examples are non-limitative and are used to better exemplify the processes of the present disclosure.

The present disclosure includes a process for preparing lithium hydroxide, the process comprising:
  submitting an aqueous composition comprising lithium sulfate and/or lithium bisulfate to a first electromembrane process that comprises a two-compartment membrane process under suitable conditions for conversion of the lithium sulfate and/or lithium bisulfate to lithium hydroxide, and obtaining a first lithium-reduced aqueous stream and a first lithium hydroxide-enriched aqueous stream; and
  submitting the first lithium-reduced aqueous stream to a second electromembrane process that comprises a three-compartment membrane process under suitable conditions to prepare at least a further portion of lithium hydroxide and obtaining a second lithium-reduced aqueous stream and a second lithium-hydroxide enriched aqueous stream.

For example, during the first electromembrane process consumption of the lithium sulfate and/or lithium bisulfate to prepare lithium hydroxide can proceed to a pre-determined extent.

Accordingly, the present disclosure also includes a process for preparing lithium hydroxide, the process comprising:
submitting an aqueous composition comprising a lithium compound such as lithium sulfate and/or lithium bisulfate to a first electromembrane process under suitable conditions for conversion of the lithium compound such as lithium sulfate and/or lithium bisulfate to lithium hydroxide to proceed to a pre-determined extent and obtaining a first lithium-reduced aqueous stream and a first lithium hydroxide-enriched aqueous stream; and
submitting the first lithium-reduced aqueous stream to a second electromembrane process under suitable conditions to prepare at least a further portion of lithium hydroxide and obtaining a second lithium-reduced aqueous stream and a second lithium-hydroxide enriched aqueous stream.

For example, the lithium compound can comprise, consist essentially of or consist of lithium chloride (LiCl), lithium fluoride (LiF), lithium sulfate ($Li_2SO_4$), lithium bisulfate ($LiHSO_4$), lithium bicarbonate ($LiHCO_3$), lithium carbonate ($Li_2CO_3$), lithium nitrate ($LiNO_3$), lithium acetate ($LiC_2H_3O_2$), lithium stearate and/or lithium citrate. For example, the lithium compound can comprise, consist essentially of or consist of lithium sulfate and/or lithium bisulfate.

For example, the composition comprising lithium sulfate and/or lithium bisulfate can also comprise $H_2SO_4$.

For example, in the processes of the present disclosure, the aqueous composition comprising the lithium compound such as lithium sulfate and/or lithium bisulfate is submitted to a first electromembrane process under suitable conditions for conversion of the lithium compound such as lithium sulfate and/or lithium bisulfate to lithium hydroxide to proceed to a pre-determined extent. The selection of a suitable pre-determined extent for a particular process of the present disclosure can be made by a person skilled in the art. For example, the aqueous composition comprising the lithium compound such as lithium sulfate and/or lithium bisulfate is submitted to a first electromembrane process under suitable conditions for consumption of the lithium compound such as lithium sulfate and/or lithium bisulfate to prepare lithium hydroxide until one or more competing side reactions proceed to a pre-determined extent, for example to an extent such that the preparation of lithium hydroxide is no longer efficient. For example, wherein the first electromembrane process is a two-compartment monopolar or bipolar membrane electrolysis process carried out in a first electrochemical cell comprising an anolyte compartment separated from a catholyte compartment by a cation exchange membrane, conversion of the lithium compound such as lithium sulfate and/or lithium bisulfate to lithium hydroxide can proceed until hydroxide current efficiency is no longer efficient, for example hydroxide current efficiency is no longer at least substantially maintained so that it decreases. For example, wherein the first electromembrane process is a two-compartment monopolar or bipolar membrane electrolysis process carried out in a first electrochemical cell comprising an anolyte compartment separated from a catholyte compartment by a cation exchange membrane, conversion of the lithium compound such as lithium sulfate and/or lithium bisulfate to lithium hydroxide can proceed until pH in the anolyte compartment is a value of about 0.3 to about 1.4, about 0.4 to about 1.2, about 0.4 to about 1.2, about 0.5 to about 0.8, about 0.5 to about 0.7 or about 0.6.

For example, wherein the first electromembrane process is a two-compartment monopolar or bipolar membrane electrolysis process carried out in a first electrochemical cell comprising an anolyte compartment separated from a catholyte compartment by a cation exchange membrane, conversion of the lithium compound such as lithium sulfate and/or lithium bisulfate to lithium hydroxide can proceed until consumption of a particular amount of the lithium sulfate and/or lithium bisulfate comprised within the aqueous composition.

For example, the pre-determined extent can comprise consumption of about 30 to about 60 weight % or of about 30 to about 50 weight % of the lithium sulfate and/or lithium bisulfate comprised within the aqueous composition, based on the total amount of lithium sulfate and/or lithium bisulfate contained in the aqueous composition. For example, the pre-determined extent can comprise consumption of about 35 to about 45 weight % of the lithium sulfate and/or lithium bisulfate comprised within the aqueous composition. For example, the pre-determined extent can comprise consumption of about 38 to about 42% of the lithium sulfate and/or lithium bisulfate comprised within the aqueous composition. For example, the aqueous composition can comprise lithium sulfate and the pre-determined extent can comprise consumption of about 30 to about 50% of the lithium sulfate comprised within the aqueous composition. For example, the aqueous composition can comprise lithium sulfate and the pre-determined extent can comprise consumption of about 35 to about 45% of the lithium sulfate comprised within the aqueous composition. For example, the aqueous composition can comprise lithium sulfate and the pre-determined extent can comprise consumption of about 38 to about 42% of the lithium sulfate comprised within the aqueous composition.

For example, the first electromembrane process can comprise, consist essentially of or consist of a three-compartment membrane electrolysis process, for example a three-compartment monopolar or bipolar membrane electrolysis process.

For example, the first electromembrane process can comprise, consist essentially of or consist of a two-compartment membrane electrolysis process, for example a two-compartment monopolar or bipolar membrane electrolysis process.

For example, the first electromembrane process can comprise, consist essentially of or consist of a three-compartment membrane electrolysis process, for example a three-compartment bipolar membrane electrolysis process.

For example, the first electromembrane process can comprise, consist essentially of or consist of a two-compartment membrane electrolysis process, for example a two-compartment bipolar membrane electrolysis process.

For example, the two-compartment membrane electrolysis process such as the two-compartment monopolar or bipolar membrane electrolysis process can be carried out in a first electrochemical cell comprising an anolyte compartment separated from a catholyte compartment by a cation exchange membrane.

For example, the cation exchange membrane can comprise, consist essentially of or consist of a perfluorosulfonic acid such as a Nafion™ 324 (or perfluorinate sulfonic acid), a cation exchange membrane or other membranes used for caustic concentration such as FuMA-Tech FKB or Astom CMB cation exchange membranes. The selection of a suitable cation exchange membrane for a particular process of the present disclosure can be made by a person skilled in the art.

For example, during the two-compartment membrane electrolysis process such as the two-compartment monopolar or bipolar membrane electrolysis process, an aqueous stream comprising the lithium compound such as lithium sulfate and/or lithium bisulfate can be introduced into the anolyte compartment, the first lithium-reduced aqueous stream can be removed from the anolyte compartment and the first lithium hydroxide-enriched aqueous stream can be removed from the catholyte compartment.

For example, in the catholyte compartment of the two-compartment monopolar or bipolar membrane electrolysis process, lithium hydroxide can be at least substantially maintained at a concentration of about 2 M to about 4 M, about 2.5 to about 3.5 M, about 2.8 to about 3.2 M or about 3 M.

For example, during the two-compartment monopolar or bipolar membrane electrolysis process, the aqueous stream comprising the lithium compound such as lithium sulfate and/or lithium bisulfate can be introduced into the anolyte compartment at a temperature of about 10° C. to about 100° C., about 10° C. to about 100° C., about 10° C. to about 90° C., about 20° C. to about 85° C. or about 80° C.

For example, during the two-compartment monopolar or bipolar membrane electrolysis process, the first lithium-reduced aqueous stream can be removed from the anolyte compartment at a temperature of about 20° C. to about 100° C., about 20° C. to about 85° C., about 20° C. to about 85° C., about 60° C. to about 85° C., about 70° C. to about 85° C. or about 80° C.

For example, during the two-compartment monopolar or bipolar membrane electrolysis process, temperature in the first electrochemical cell can be at least substantially maintained at a value of about 60° C. to about 110° C., about 60° C. to about 100° C., about 60° C. to about 90° C., about 60° C. to about 85° C., about 50° C. to about 70° C., about 55° C. to about 65° C., about 75° C. to about 85° C. or about 80° C.

For example, in the two-compartment monopolar or bipolar membrane electrolysis process, current density can be at least substantially maintained at a value of from about 0.1 kA/m$^2$ to about 8000 kA/m$^2$, 0.5 kA/m$^2$ to about 6 kA/m$^2$, about 1 kA/m$^2$ to about 6 kA/m$^2$, about 2 kA/m$^2$ to about 6 kA/m$^2$ or about 3 kA/m$^2$ to about 5 kA/m$^2$. For example, current density can be at least substantially maintained at a value chosen from about 3 kA/m$^2$, about 4 kA/m$^2$ and about 5 kA/m$^2$. For example, current density can be at least substantially maintained at a value of about 4 kA/m$^2$.

For example, in the two-compartment monopolar or bipolar membrane electrolysis process, voltage can be at least substantially maintained at a value of about 3 V to about 8 V, about 5 V to about 10 V, about 4 V to about 6 V, about 4 to about 5 or about 4.5.

For example, the first electrochemical cell can have a surface area of about 100 m$^2$ to about 2000 m$^2$, about 100 m$^2$ to about 1000 m$^2$, about 400 m$^2$ to about 500 m$^2$ or about 430 m$^2$.

For example, the second electromembrane process can comprise, consist essentially of or consist of a two-compartment membrane electrolysis process, for example a two-compartment monopolar or bipolar membrane electrolysis process.

For example, the second electromembrane process can comprise, consist essentially of or consist of a three-compartment membrane electrolysis process, for example a three-compartment monopolar or bipolar membrane electrolysis process.

For example, the three-compartment membrane electrolysis process such as the three-compartment monopolar or bipolar membrane electrolysis process can be carried out in a second electrochemical cell comprising an anolyte compartment separated from a central compartment by an anion exchange membrane and a catholyte compartment separated from the central compartment by a cation exchange membrane.

For example, the cation exchange membrane can comprise, consist essentially of or consist of a perfluorsulfonic acid such as a Nafion™ 324 cation exchange membrane or other membranes used for caustic concentration such as FuMA-Tech FKB or Astom CMB cation exchange membranes. The selection of a suitable cation exchange membrane for a particular process of the present disclosure can be made by a person skilled in the art.

For example, during the three-compartment membrane electrolysis process such as the three-compartment monopolar or bipolar membrane electrolysis process, the first lithium-reduced aqueous stream can be introduced into the central compartment, the second lithium-reduced aqueous stream can be removed from the central compartment and the second lithium hydroxide-enriched aqueous stream can be removed from the catholyte compartment.

For example, the three-compartment membrane electrolysis process such as the three-compartment monopolar or bipolar membrane electrolysis process can further comprise producing an acid such as sulfuric acid in the anolyte compartment and removing an acid-containing aqueous stream such as a sulfuric acid-containing aqueous stream from the anolyte compartment.

The selection of a suitable anion exchange membrane for a particular process of the present disclosure can be made by a person skilled in the art. For example, it will be appreciated by a person skilled in the art that a proton-blocking membrane may, for example be useful in processes coproducing acids such as sulfuric acid. For example, in the three-compartment monopolar or bipolar membrane electrolysis process, the anion exchange membrane can be a proton-blocking membrane. For example, the proton-blocking membrane can such as a Fumatech FAB, Astom ACM or Asahi MV anion exchange membrane.

For example, in the anolyte compartment of the three-compartment monopolar or bipolar membrane electrolysis process, the acid such as sulfuric acid can be at least substantially maintained at a concentration of acid such as sulfuric acid of about 0.1 M to about 2 M. For example, in the anolyte compartment of the three-compartment monopolar or bipolar membrane electrolysis process, the sulfuric acid can be at least substantially maintained at a concentration of sulfuric acid can be about 0.5 M to about 1.5 M, about 0.7 M to about 1.2 M, or about 0.8 M.

For example, in the catholyte compartment of the three-compartment membrane electrolysis process, the lithium hydroxide can be at least substantially maintained at a concentration of about 1 M to about 5.0 M, about 1 M to about 4.0 M, about 1.5 M to about 2.5 M, about 1.8 M to about 2.2 M, or about 2 M.

For example, during the three-compartment monopolar or bipolar membrane electrolysis process, the first lithium-reduced aqueous stream can be introduced into the central compartment at a temperature of about 20° C. to about 85°

C., about 40° C. to about 85° C., about 40° C. to about 75° C., about 50° C. to about 70° C., about 50° C. to about 65° C. or about 60° C.

For example, during the three-compartment monopolar or bipolar membrane electrolysis process, the second lithium-reduced aqueous stream can be removed from the anolyte compartment at a temperature of about 20° C. to about 80° C., about 30° C. to about 70° C., about 40° C. to about 80° C. or about 60° C.

For example, during the three-compartment monopolar or bipolar membrane electrolysis process, temperature in the second electrochemical cell can be at least substantially maintained at a value of about 30° C. to about 90° C., about 40° C. to about 85° C., about 50° C. to about 80° C., about 50° C. to about 70° C., about 50° C. to about 65° C., about 50° C. to about 70° C., about 55° C. to about 65° C., or about 60° C.

For example, in the three-compartment monopolar or bipolar membrane electrolysis process, current density can be at least substantially maintained at a value of about 0.5 kA/m$^2$ to about 5 kA/m$^2$, about 1 kA/m$^2$ to about 2 kA/m$^2$, about 3 kA/m$^2$ to about 5 kA/m$^2$, about 4 kA/m$^2$ or about 1.5 kA/m$^2$.

For example, in the three-compartment monopolar or bipolar membrane electrolysis process, voltage can be at least substantially maintained at a value of about 5 V to about 9 V, about 6 V to about 8 V, about 6.5 V to about 7.5 V or about 7 V.

For example, the second electrochemical cell can have a cell area of about 1000 m$^2$ to about 4000 m$^2$, about 2000 m$^2$ to about 3000 m$^2$ or about 2700 m$^2$.

Alternatively, for example, in the processes of the present disclosure, the three compartment monopolar or bipolar membrane electrolysis process can further comprise introducing ammonia into the anolyte compartment, producing an ammonium compound such as ammonium sulfate in the anolyte compartment and removing an ammonium compound-containing aqueous stream such as an ammonium sulfate-containing aqueous stream from the anolyte compartment.

The selection of a suitable anion exchange membrane for a particular process of the present disclosure can be made by a person skilled in the art. For example, it will be appreciated by a person skilled in the art that in processes that do not coproduce acids such as sulfuric acid, an anion exchange membrane that is not a proton-blocking membrane may be useful as it may, for example be able to withstand higher temperatures and/or have lower resistance than a proton-blocking membrane. For example, in the three-compartment monopolar or bipolar membrane electrolysis process, the anion exchange membrane may not be a proton-blocking membrane. For example, the anion exchange membrane can be a such as an Astom AHA anion exchange membrane or FuMA-Tech FAP.

For example, in the anolyte compartment of the three-compartment monopolar or bipolar membrane electrolysis process, the ammonium compound such as ammonium sulfate can be at least substantially maintained at a concentration of ammonium compound such as ammonium sulfate of about 0.5 M to about 5M, about 1 M to about 4M or about 3 M.

For example, in the catholyte compartment of the three-compartment monopolar or bipolar membrane electrolysis process, the lithium hydroxide can be at least substantially maintained at a concentration of about 1 M to about 4.0 M, about 1.5 M to about 2.5 M or about 2 M.

For example, the processes of the present disclosure can further comprise recycling at least a portion of the second lithium-reduced aqueous stream to the first electromembrane process. For example, it is possible to re-use a two-compartment monopolar or bipolar membrane electrolysis cell to obtain a higher concentration of lithium hydroxide. It will also be appreciated by a person skilled in the art that a continuous process for preparing lithium hydroxide may also be useful.

For example, the second lithium-reduced aqueous stream can be recycled to the first electromembrane process when in the second electromembrane process, pH in the central compartment of the second electrochemical cell reaches a value of about 2 to about 12, about 3 to about 10, about 4 to about 9, about 5 to about 8 or about 8 in order to control the pH of the first lithium-reduced aqueous stream above a value of about 0.4 to about 1.2, about 0.5 to about 0.8, about 0.5 to about 0.7 or about 0.6.

For example, the process can further comprise submitting the recycled second lithium-reduced aqueous stream to the first electromembrane process until pH in the anolyte compartment is a value of about 0.4 to about 1.2, about 0.5 to about 0.8, about 0.5 to about 0.7 or about 0.6, then re-submitting the first lithium-reduced aqueous stream to the second electromembrane process.

For example, pH in the anolyte compartment of the two-compartment monopolar or bipolar membrane electrolysis process and/or the central compartment of the three-compartment monopolar or bipolar membrane electrolysis process can be at least substantially maintained. For example, pH can be at least substantially maintained by adjusting at least one of current density of the two-compartment monopolar or bipolar membrane electrolysis process, current density of the three-compartment monopolar or bipolar membrane electrolysis process, flow rate of the first lithium-reduced aqueous stream and flow rate of the second lithium-reduced aqueous stream.

The present disclosure also includes a process for preparing lithium hydroxide, the process comprising:
  submitting an aqueous composition comprising lithium sulfate and/or lithium bisulfate to a two-compartment monopolar or bipolar membrane electrolysis process carried out in a first electrochemical cell comprising an anolyte compartment separated from a catholyte compartment by a cation exchange membrane under suitable conditions for conversion of the lithium sulfate and/or lithium bisulfate to lithium hydroxide and obtaining a first lithium-reduced aqueous stream and a first lithium hydroxide-enriched aqueous stream; and
  submitting the first lithium-reduced aqueous stream to a three-compartment monopolar or bipolar membrane electrolysis process carried out in a second electrochemical cell comprising an anolyte compartment separated from a central compartment by an anion exchange membrane and a catholyte compartment separated from the central compartment by a cation exchange membrane under suitable conditions to prepare at least a further portion of lithium hydroxide and obtaining a second lithium-reduced aqueous stream and a second lithium-hydroxide enriched aqueous stream.

For example, during the two-compartment monopolar or bipolar membrane electrolysis process conversion of the lithium sulfate and/or lithium bisulfate to lithium hydroxide can proceed to a pre-determined extent.

Accordingly, the present disclosure also includes a process for preparing lithium hydroxide, the process comprising:

submitting an aqueous composition comprising a lithium compound such as lithium sulfate and/or lithium bisulfate to a two-compartment monopolar or bipolar membrane electrolysis process carried out in a first electrochemical cell comprising an anolyte compartment separated from a catholyte compartment by a cation exchange membrane under suitable conditions for conversion of the lithium compound such as lithium sulfate and/or lithium bisulfate to lithium hydroxide to proceed to a pre-determined extent, and obtaining a first lithium-reduced aqueous stream and a first lithium hydroxide-enriched aqueous stream; and submitting the first lithium-reduced aqueous stream to a three-compartment monopolar or bipolar membrane electrolysis process carried out in a second electrochemical cell comprising an anolyte compartment separated from a central compartment by an anion exchange membrane and a catholyte compartment separated from the central compartment by a cation exchange membrane under suitable conditions to prepare at least a further portion of lithium hydroxide and obtaining a second lithium-reduced aqueous stream and a second lithium-hydroxide enriched aqueous stream.

For example, during the two-compartment monopolar or bipolar membrane electrolysis process, an aqueous stream comprising the lithium compound such as lithium sulfate and/or lithium bisulfate can be introduced into the anolyte compartment, the first lithium-reduced aqueous stream can be removed from the anolyte compartment and the first lithium hydroxide-enriched aqueous stream can be removed from the catholyte compartment; and during the three-compartment monopolar or bipolar membrane electrolysis process, the first lithium-reduced aqueous stream can be introduced into the central compartment, the second lithium-reduced aqueous stream can be removed from the central compartment and the second lithium hydroxide-enriched aqueous stream can be removed from the catholyte compartment.

For example, the process can further comprise recycling at least a portion of the second lithium-reduced aqueous stream to the two-compartment monopolar or bipolar membrane electrolysis process.

It will be appreciated by a person skilled in the art that the process can also be varied, as appropriate, using the examples discussed herein.

For example, at least a portion of the processes of the present disclosure can be operated as a batch process. Alternatively, for example, the processes can be operated as a continuous process or a semi-continuous process. For example, it would be appreciated by a person skilled in the art that pH in the anolyte compartment of the two-compartment monopolar or bipolar membrane electrolysis process and/or the central compartment of the three-compartment monopolar or bipolar membrane electrolysis cell can be at least substantially maintained by adjusting the current density of the two-compartment monopolar or bipolar membrane electrolysis process and/or the three-compartment monopolar or bipolar membrane electrolysis process and/or the flow rate of the streams flowing between the processes, for example as described herein.

For example, pH in the anolyte compartment of the two-compartment monopolar or bipolar membrane electrolysis process and/or the central compartment of the three-compartment monopolar or bipolar membrane electrolysis process can be at least substantially maintained.

For example, pH can be at least substantially maintained by adjusting at least one of current density of the two-compartment monopolar or bipolar membrane electrolysis process, current density of the three-compartment monopolar or bipolar membrane electrolysis process, flow rate of the first lithium-reduced aqueous stream and flow rate of the second lithium-reduced aqueous stream.

The selection of a suitable means for measuring and/or monitoring pH can be made by a person skilled in the art. The selection of a suitable current density and/or a suitable flow rate can be made by a person skilled in the art.

The processes of the present disclosure can, for example also further comprise recycling at least a portion of the second lithium hydroxide-enriched aqueous stream to the first electromembrane process.

For example, the process can further comprise removing a first hydrogen-containing stream from the catholyte compartment of the first electrochemical cell. For example, the process can further comprise removing a second hydrogen-containing stream from the catholyte compartment of the second electrochemical cell. For example, the process can further comprise removing a first oxygen-containing stream from the anolyte compartment of the first electrochemical cell. For example, the process can further comprise removing a second oxygen-containing stream from the anolyte compartment of the second electrochemical cell.

For example, the means for conveying the first lithium-reduced aqueous stream from the anolyte compartment of the first electrochemical cell to the central compartment of the second electrochemical cell can be effective for conveying unconverted lithium sulfate and/or lithium bisulfate from the central compartment of the second electrochemical cell to the anolyte compartment of the first electrochemical cell.

For example, the systems of the present disclosure can further comprise means for conveying the second lithium-reduced aqueous stream from the catholyte compartment of the second electrochemical cell into the catholyte compartment of the second electrochemical cell.

For example, the anolyte compartment in the first electrochemical cell can further comprise at least one inlet for receiving an aqueous stream comprising lithium sulfate and/or lithium bisulfate.

For example, the anolyte compartment in the first electrochemical cell can further comprise at least one outlet for outputting the first lithium-reduced aqueous stream.

For example, the anolyte compartment in the first electrochemical cell further can comprise at least one outlet for outputting a first oxygen-containing stream.

For example, the catholyte compartment in the first electrochemical cell can further comprise at least one outlet for outputting the first lithium hydroxide-enriched aqueous stream.

For example, the catholyte compartment in the first electrochemical cell further can comprise at least one inlet for receiving the second lithium hydroxide-enriched aqueous stream.

For example, the catholyte compartment in the first electrochemical cell can further comprise at least one outlet for outputting a first hydrogen-containing stream.

For example, the anolyte compartment in the second electrochemical cell can be effective to prepare sulfuric acid and the second electrochemical cell further comprises at least one outlet for outputting a sulfuric acid-containing aqueous stream.

For example, the anolyte compartment in the electrochemical cell further can comprise at least one inlet for receiving a stream comprising ammonia; the anolyte compartment in the second electrochemical cell is effective to prepare ammonium sulfate and the second electrochemical cell further comprises at least one outlet for outputting an ammonium sulfate-containing aqueous stream.

For example, the anolyte compartment in the second electrochemical cell can further comprises at least one outlet for outputting a second oxygen-containing stream.

For example, the catholyte compartment in the second electrochemical cell can further comprises at least one outlet for outputting the second lithium hydroxide-enriched aqueous stream.

For example, the catholyte compartment in the second electrochemical cell can further comprises at least one outlet for outputting a second hydrogen-containing stream.

For example, the central compartment in the second electrochemical cell can further comprises at least one inlet for receiving the first lithium-reduced aqueous stream.

For example, the central compartment in the second electrochemical cell can further comprises at least one outlet for outputting the second lithium-reduced aqueous stream.

For example, the means for conveying comprise a combination of a pump and a conduit.

For example, the system can further comprise a first conduit for passing the first lithium-reduced aqueous stream from the first electrochemical cell to the second electrochemical cell.

For example, the system can further comprise a second conduit for passing the second lithium-reduced aqueous stream from the second electrochemical cell to the first electrochemical cell.

For example, the system can further comprise a third conduit for passing the second lithium hydroxide-enriched aqueous stream from the second electrochemical cell to the first electrochemical cell.

For example, the first electrochemical cell can further comprise means to measure pH in the anolyte compartment, and the system is configured to convey the first lithium-reduced aqueous stream from the first electrochemical cell to the second electrochemical cell when pH in the anolyte compartment is below a pre-determined value.

For example, the second electrochemical cell can further comprises means to measure pH in the central compartment, and the system is configured to convey unconverted lithium sulfate and/or lithium bisulfate from the central compartment of the second electrochemical cell to the anolyte compartment of the first electrochemical cell when pH in the central compartment is above a pre-determined value.

For example, the first electrochemical cell can further comprises means to measure concentration of lithium hydroxide in the catholyte compartment of the second electrochemical cell, and the system is configured to convey the second lithium hydroxide-enriched aqueous stream from the catholyte compartment of the second electrochemical cell into the catholyte compartment of the first electrochemical cell.

For example, the system can be configured to operate as a continuous process.

For example, the system can be configured to operate as a semi-continuous process.

For example, the anolyte compartment of the first electrochemical cell and the central compartment of the second electrochemical cell can be in fluid flow communication with one another by means of a pump and a conduit.

For example, the catholyte compartment of the second electrochemical cell and the catholyte compartment of the first electrochemical cell are in fluid flow communication with one another by means of a pump and a conduit.

EXAMPLES

Figure 2:
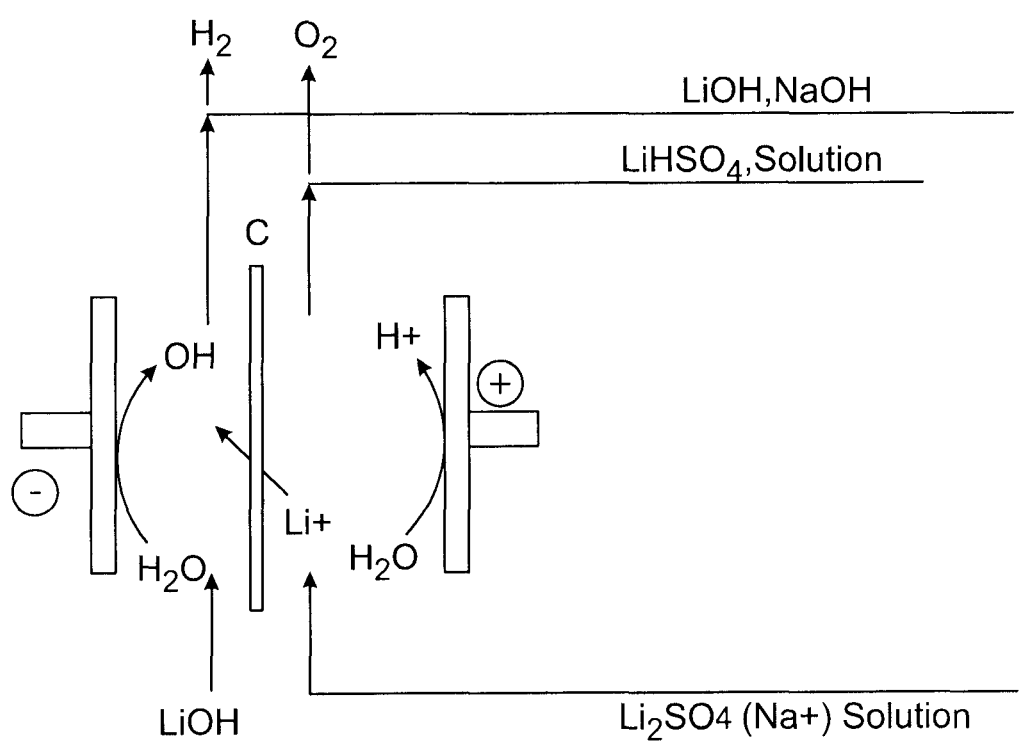
FIG. 2 is a schematic representation of a two-compartment membrane cell that can be used in a process comprising the electrolysis of an aqueous solution containing a lithium compound such as lithium sulfate and/or lithium bisulfate according to an embodiment of the present disclosure.

Certain known processes have, for example incorporated the use of a three-compartment cell, since in the two-compartment configuration shown in FIG. 2, the anodic reaction produces oxygen and protons which results in a decrease in pH of the anolyte solution. Full removal of the cation when using a two-compartment cell can become inefficient as the proton competes with lithium ion transport for charge transfer across the cation membrane. Nevertheless, partial conversion of a lithium compound such as lithium sulfate to lithium bisulfate should be possible with a two-compartment membrane electrolysis cell.

Bisulfate has a pKa of 1.9, and therefore sulfate will buffer the pH of an aqueous lithium sulfate solution such that the proton concentration will be about 0.01 M at conversion of up to half of the sulfate to bisulfate (i.e. 25% conversion). At this concentration the inefficiency due to proton at the Nafion 324 (N324) membrane will be negligible.

Previous work has shown that the pH of a solution which has been fully converted to bisulfate (i.e. 50% conversion) is about 0.9 or a proton concentration of just over 0.1 M. In this case, since a proton is more mobile than a lithium ion, the proton transport across the N324 membrane will likely be significant which can, for example decrease the current efficiency for lithium hydroxide production. Consequently, the complete conversion of lithium sulfate will not be possible, and test work summarized in the present disclosure focused on determining the efficiency as a function of conversion.

In the processes of the present disclosure, after the lithium sulfate in an aqueous solution is partially converted (in order to convert more of the lithium into lithium hydroxide) using a two-compartment membrane electrolysis process, the solution can then be sent to a three-compartment membrane electrolysis process. Testing is also reported herein where a solution produced in the two-compartment work is processed by both processes in order to study the operation of a process when the feed solution has a lower pH.

General Experimental Details

The two-compartment experiments were carried out in an ICI FM-01 lab electrolysis cell (64 cm$^2$, ICI Chemicals, UK) equipped with DSA-O$_2$ anode, stainless steel (SS316) cathode and Nafion 324 membrane. The three-compartment work was performed in an Electrocell MP cell (100 cm$^2$) similarly equipped to the three-compartment membrane electrolysis cells used in previous studies, and other aspects of the experimental setup were the same as those described previously in other applications (U.S. 61/636,869; U.S. 61/755,151; U.S. 61/788,292; PCT/CA2013/000398).

Example 1

Two-Compartment Membrane Electrolysis Cell Trials

Tests were performed using the two-compartment configuration with an aqueous solution comprising lithium sulfate as the feed solution. Since a main purpose of these runs was to evaluate the current efficiency as a function of conversion (bisulfate/sulfate), the tests were performed with about 2 M LiOH in the catholyte compartment. This is lower than the about 3 M concentration produced in previous work. However, at an about 3 M concentration, small variations in the hydroxide concentration can considerably decrease the lithium hydroxide current efficiency. In contrast, a small variation in hydroxide concentration around a concentration of about 2 M does not greatly affect the lithium hydroxide current efficiency, and therefore any changes in the efficiency can generally be attributed to proton transport from the feed.

Various runs were performed using the two-compartment cell at varying current densities. FIGS. 3-5 are plots relating to the experiments summarized in Table 1: FIGS. 3A-3D relate to experiment no. 856-96; FIGS. 4A-4D relate to experiment no. 856-99; and FIGS. 5A-5D relate to experiment no. 879-1. The results of the experiments using the two-compartment cell and aspects of the processes of these runs are discussed below.

Figure 3A:
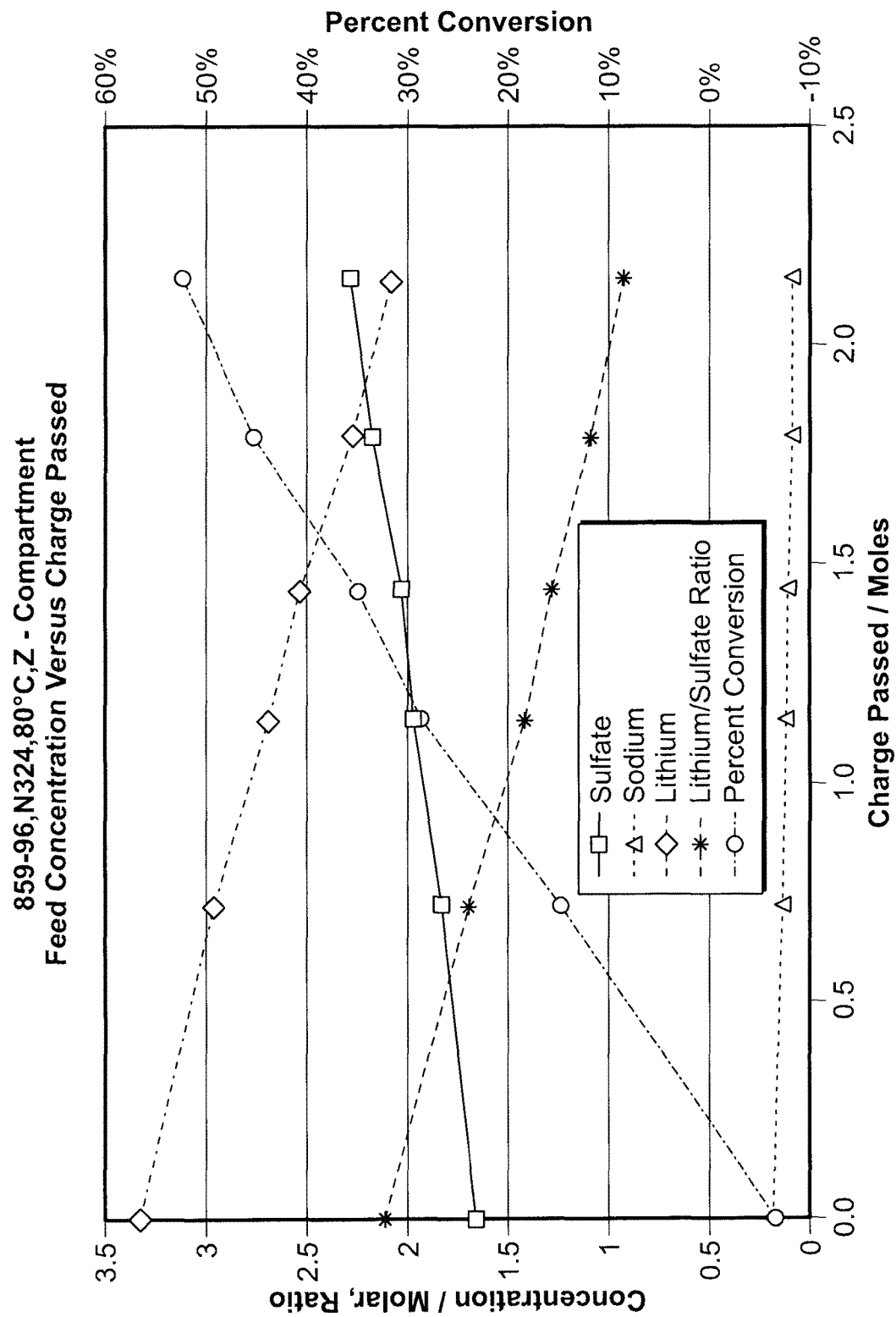

As each run progressed, lithium and sodium ions were removed from the feed as shown, for example in FIG. 3A. As water is removed from the feed, the sulfate ion concentration is concentrated from about 1.7 M up to about 2.3 M which, along with lithium ion transport out of the feed, changes the ratio of lithium ion to sulfate ion in the feed from over about 2 at the beginning of the electrolysis to less than about 1 at the end. In this run, slightly more than about 50% of the conversion was performed so that the final anolyte solution contains only lithium bisulfite and a small amount of sulfuric acid.

Figure 3B:
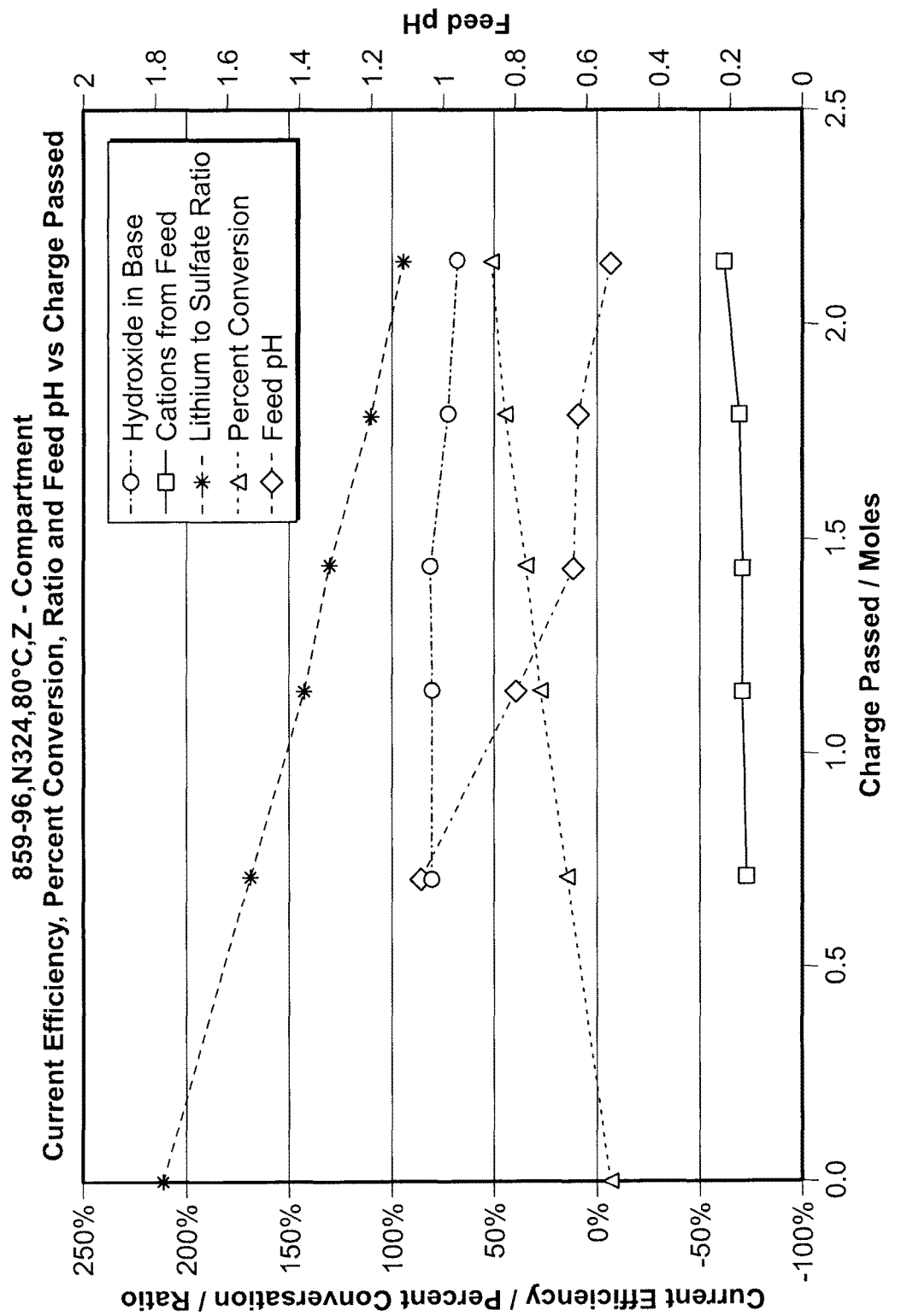
Figure 3C:
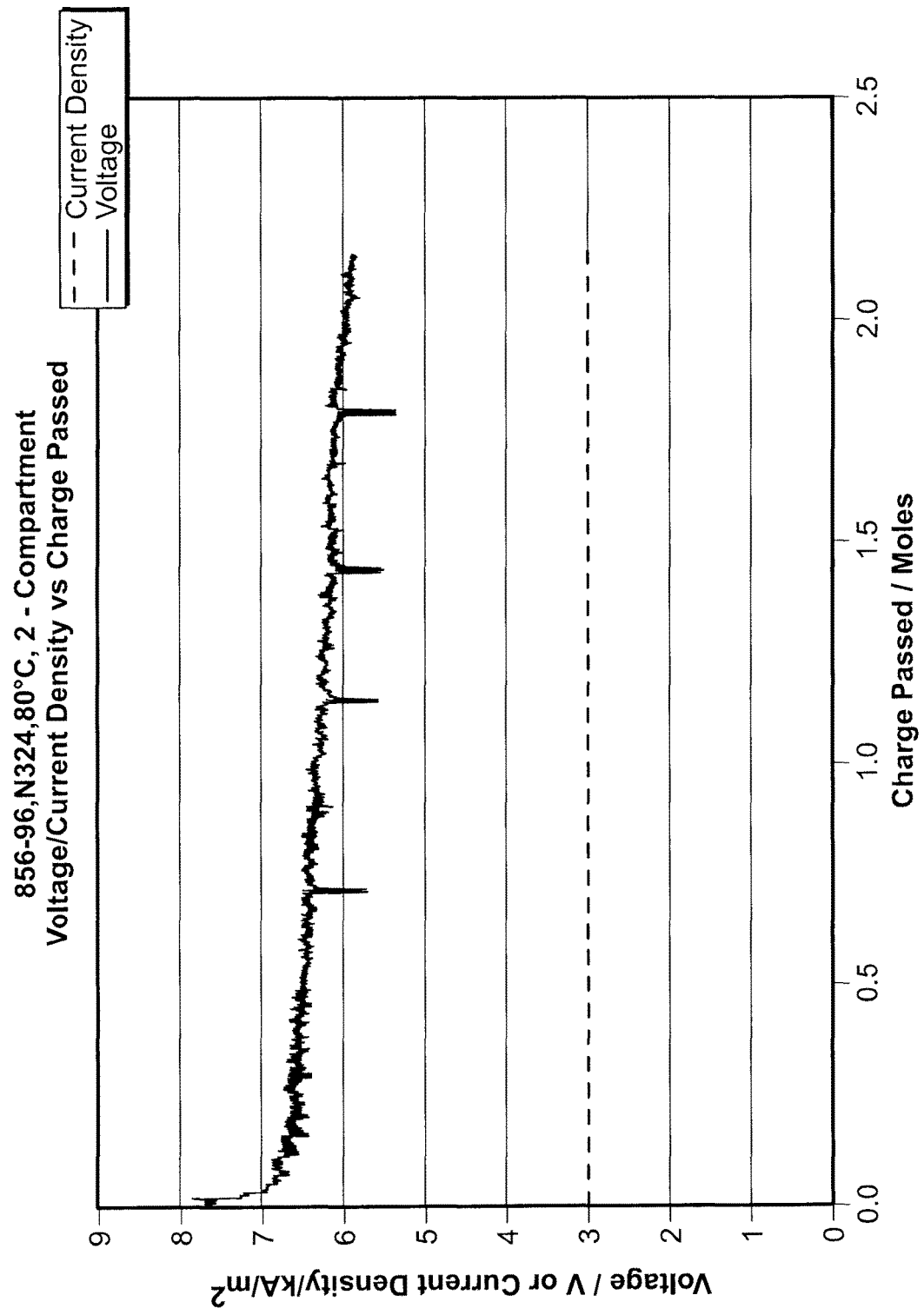
Figure 3D:
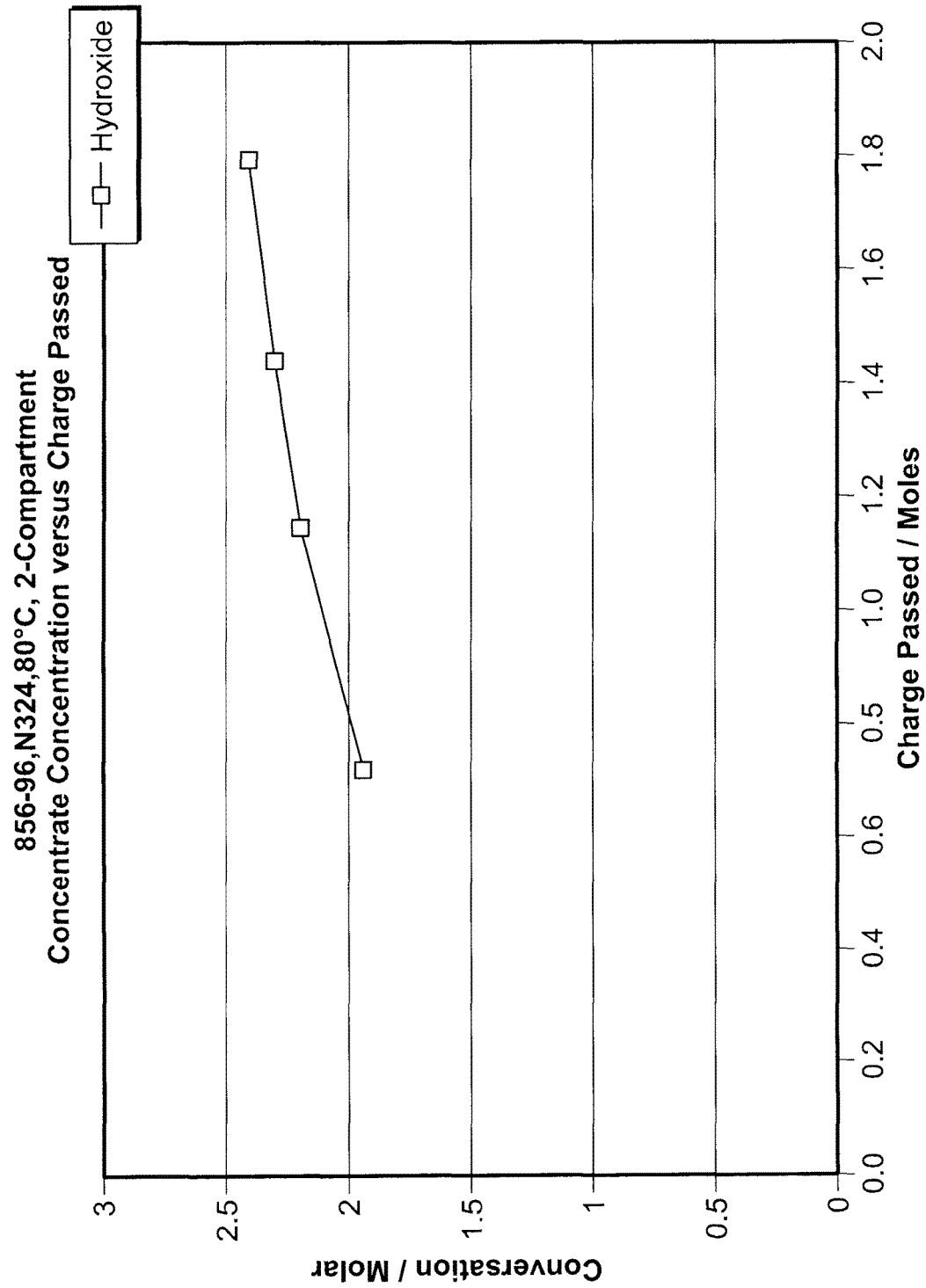

Samples of the two compartments were periodically taken during the run and evaluated for current efficiency. FIG. 3B shows the cumulative current efficiency for hydroxide production in the catholyte and cation loss from the feed. As shown, the current efficiency starts to decrease between the samples taken at about 35% conversion and about 45% conversion. Although the change in the cumulative current efficiency looks small, the change in the incremental current efficiency (not shown) is considerable. This change seems to occur when the measured feed pH reaches about 0.6.

The runs at higher current density had similar trends. Table 1 provides results for the three runs performed with the current density at about 3 kA/m² (experiment no. 856-96), about 4 kA/m² (experiment no. 856-99) and about 5 kA/m² (experiment no. 879-1) The current efficiencies of hydroxide for the runs were close to about 80% for the initial portion of the run. The point at which the current efficiency started to decrease seemed to occur slightly later (i.e. at a higher conversion) for runs carried out using a higher current density.

Figure 4A:
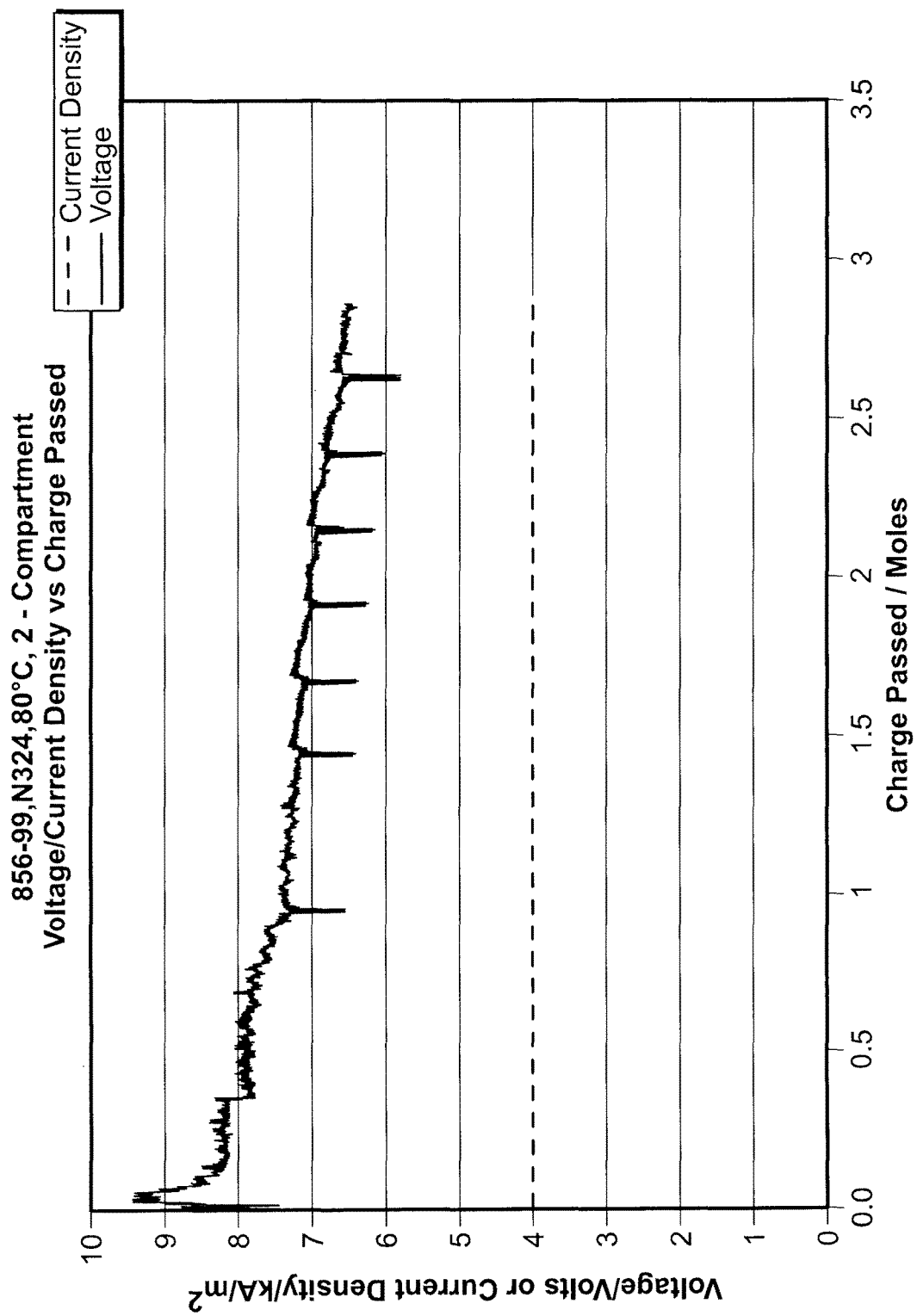
Figure 4B:
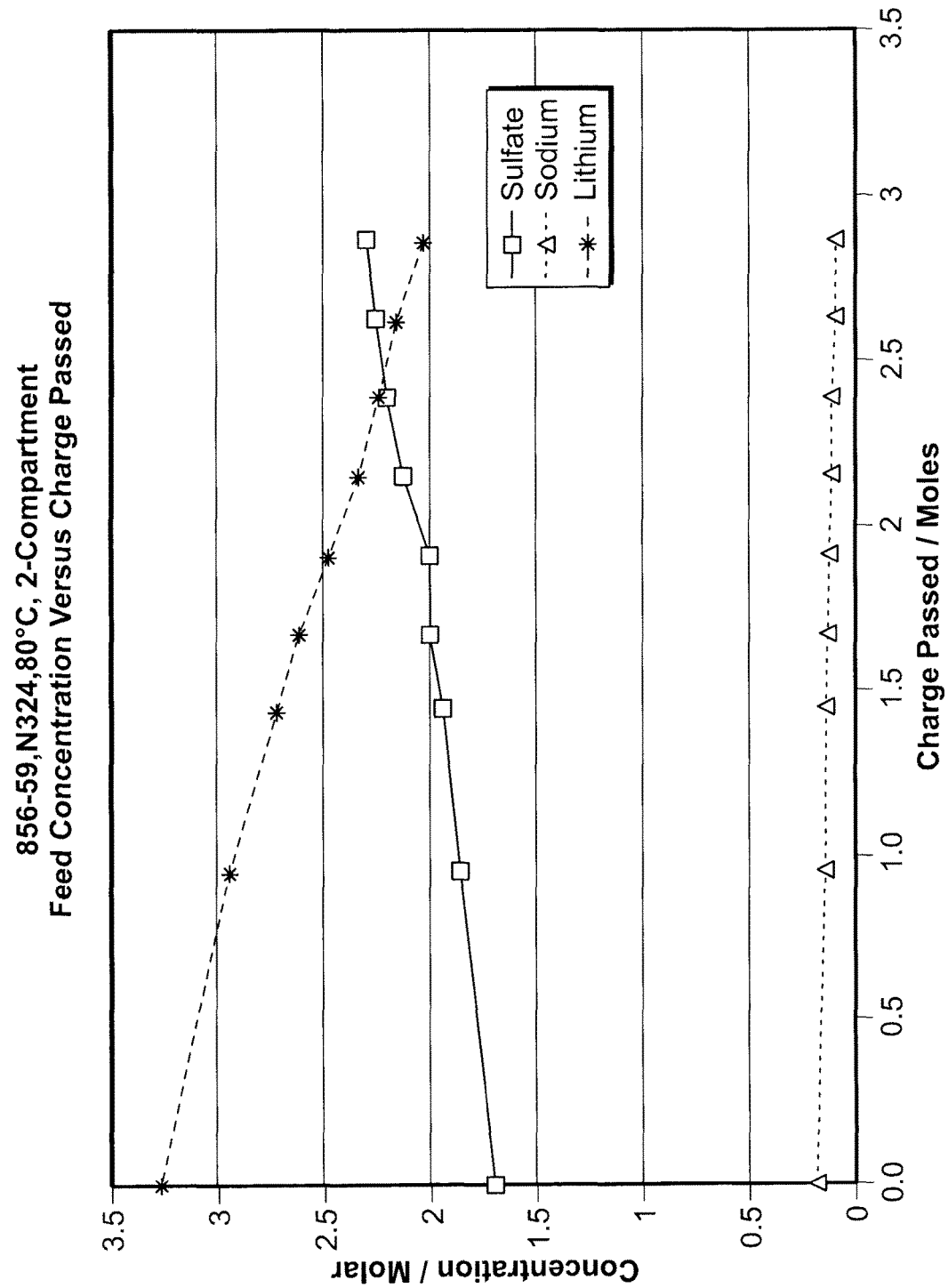
Figure 4C:
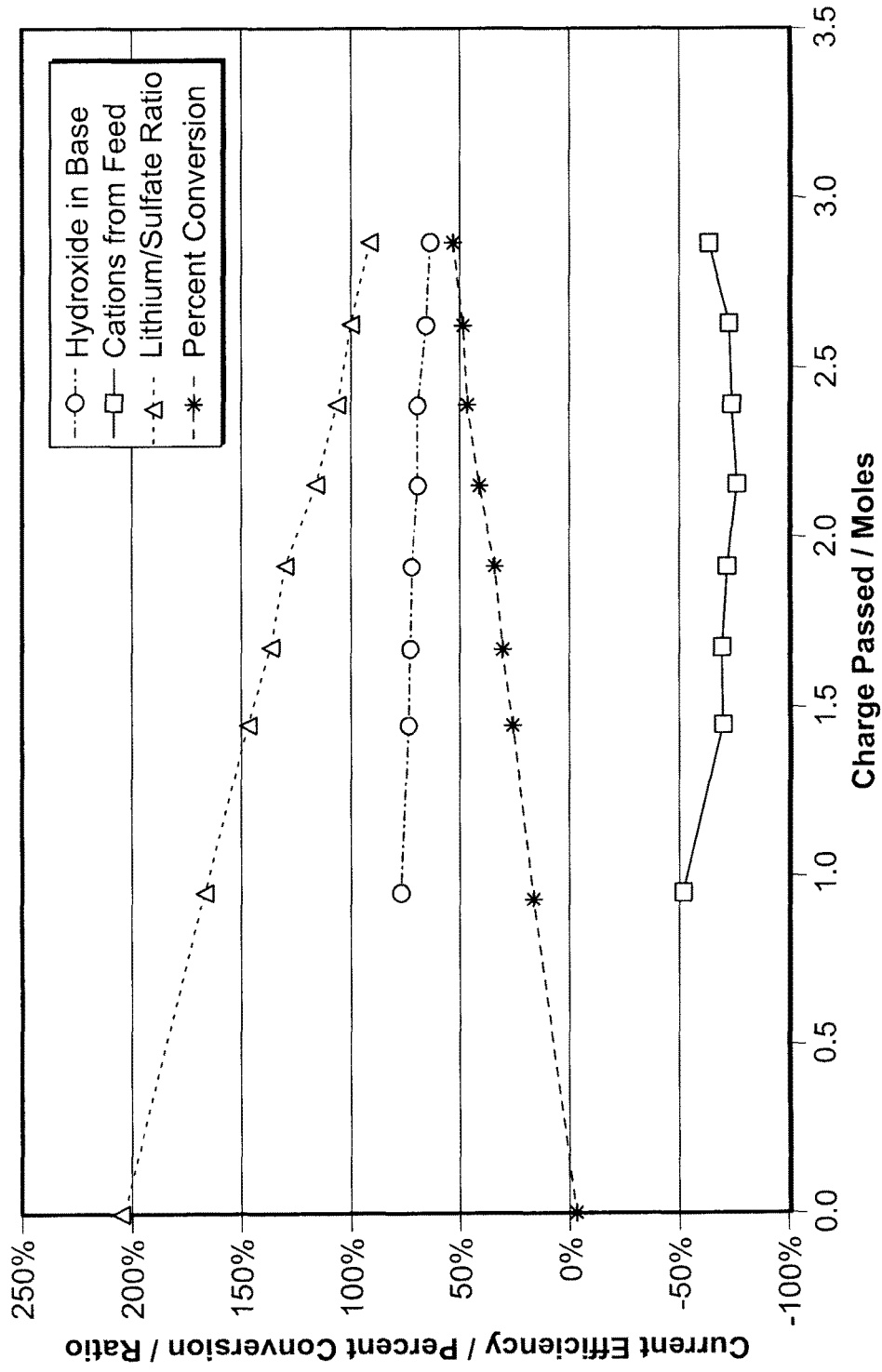
Figure 4D:
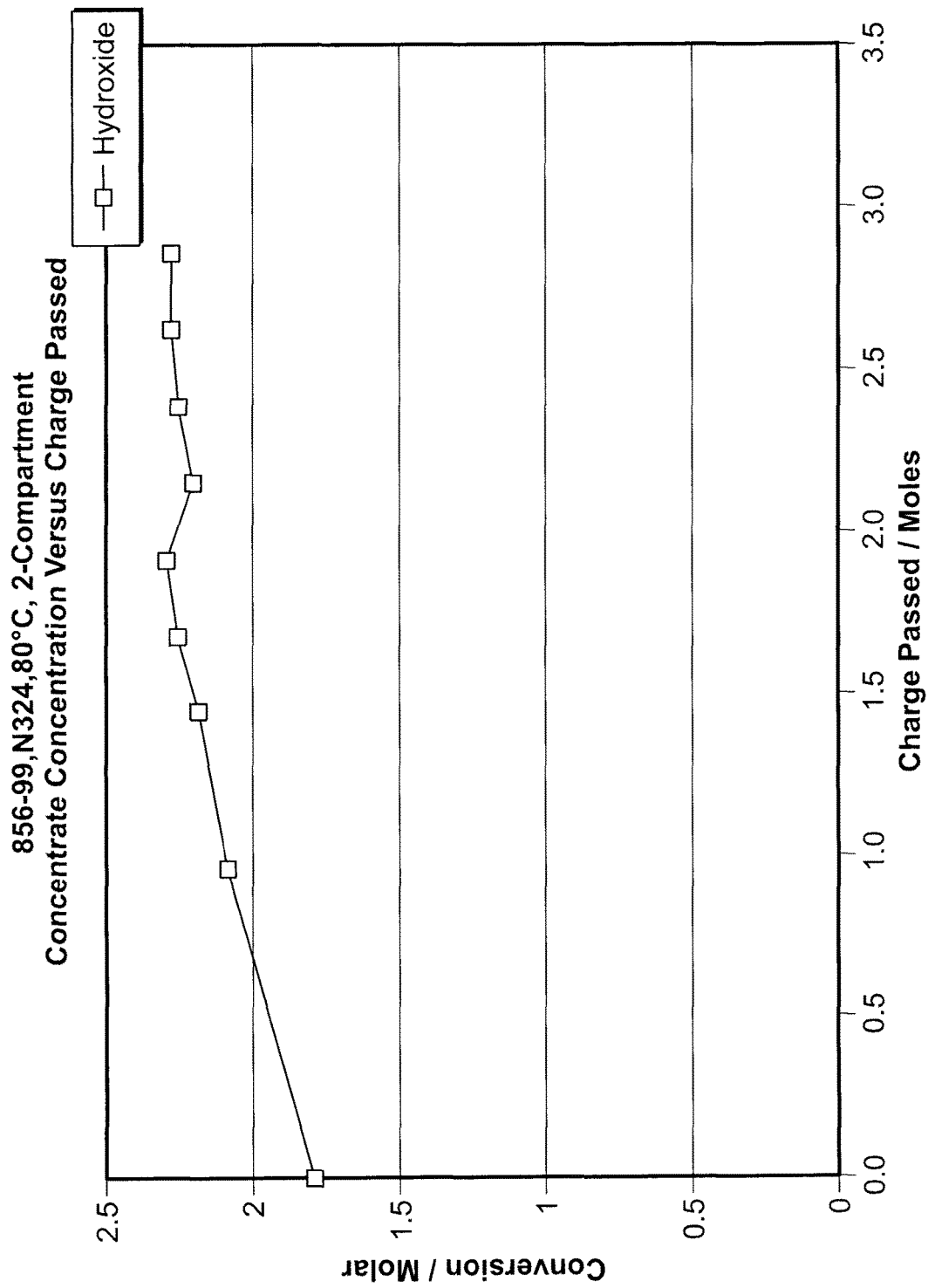
Figure 5A:
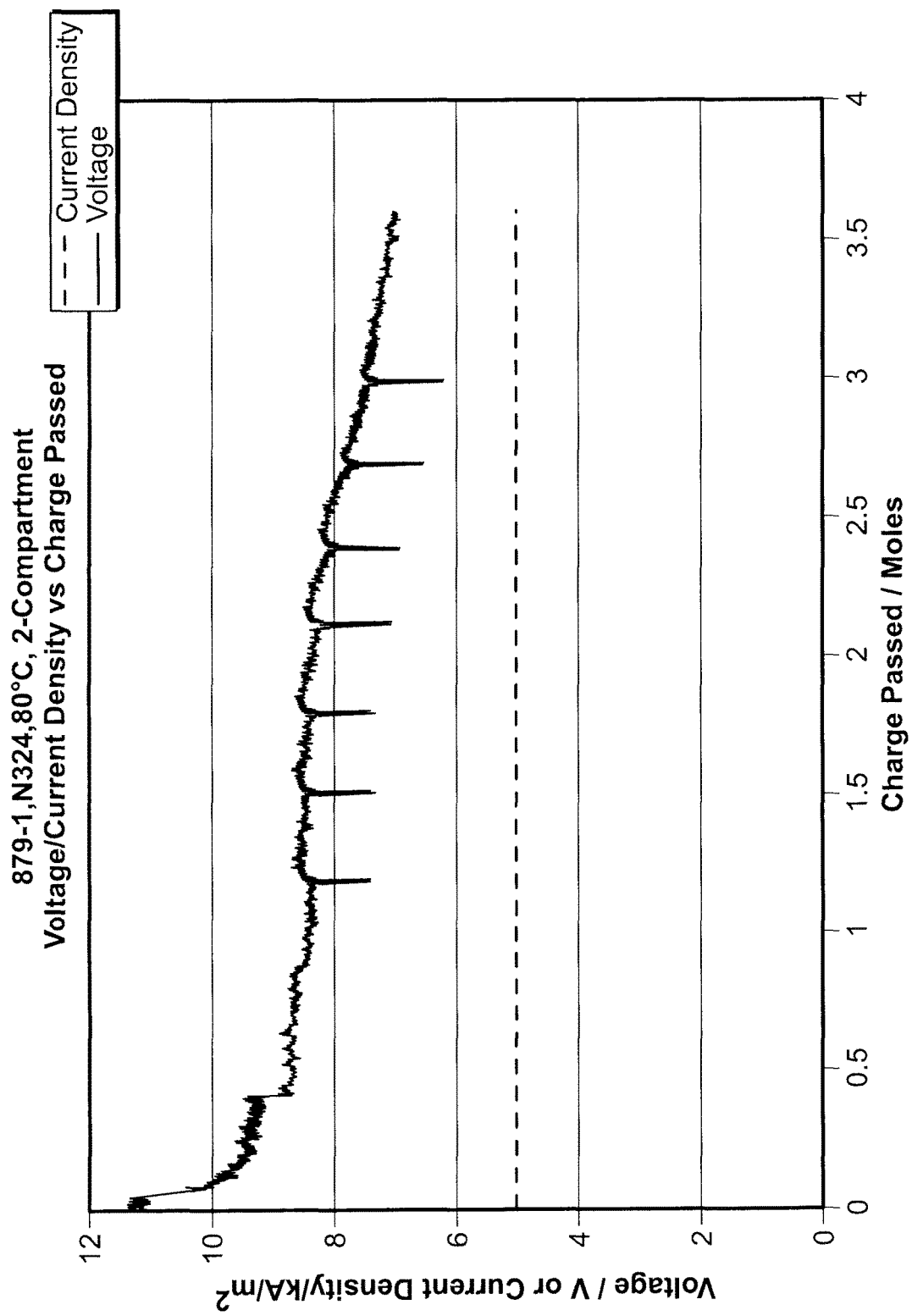
Figure 5B:
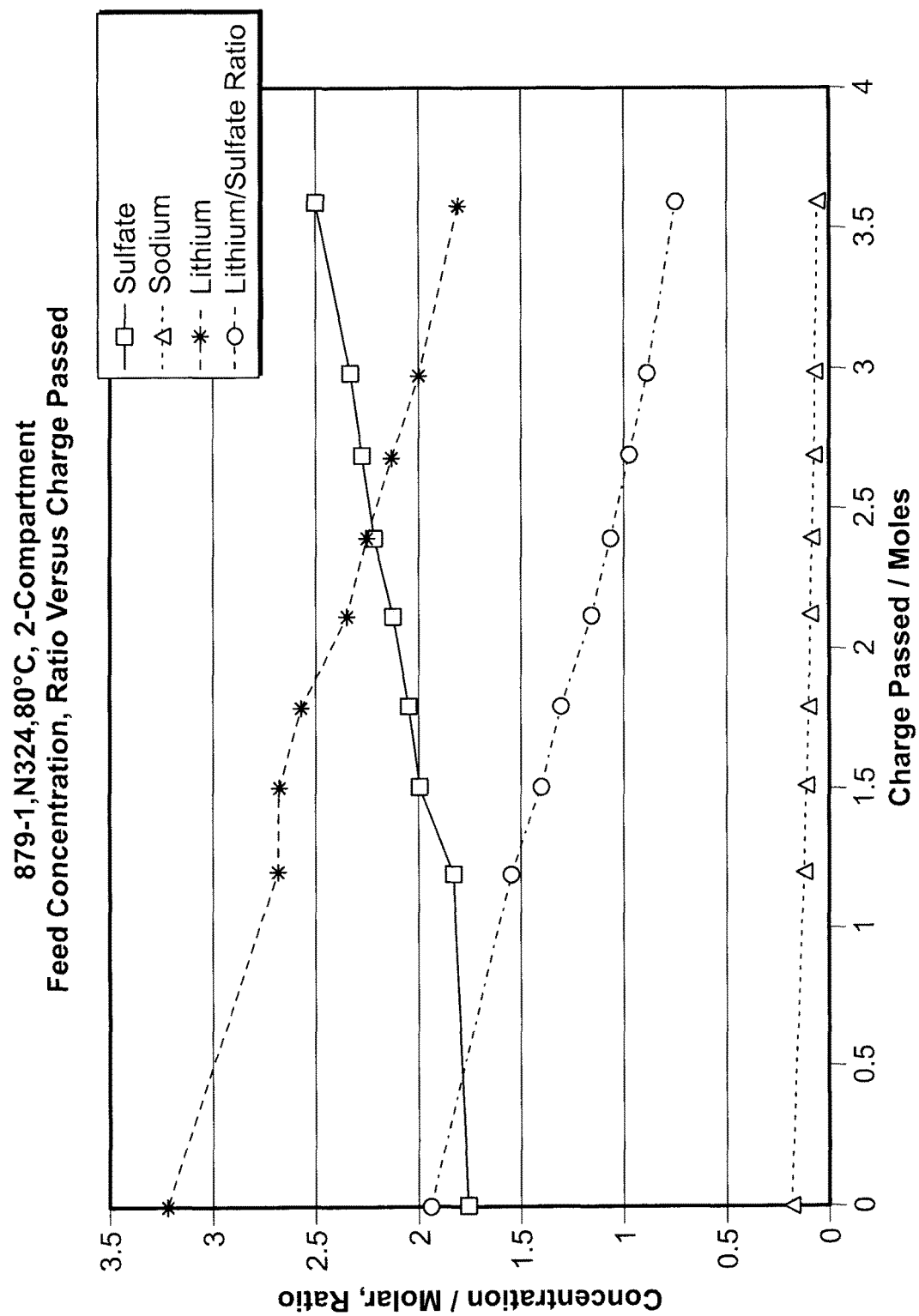
Figure 5C:
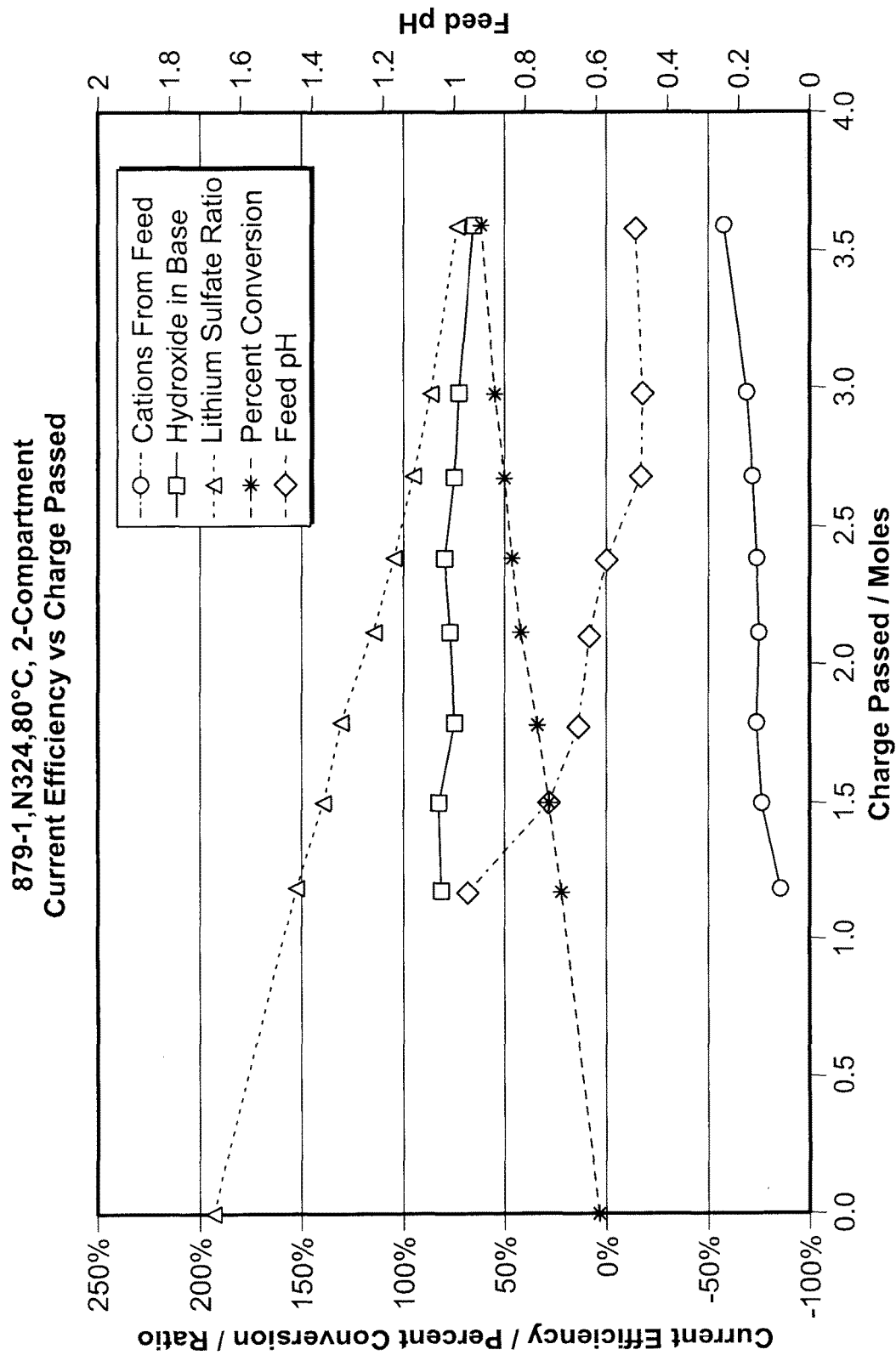
Figure 5D:
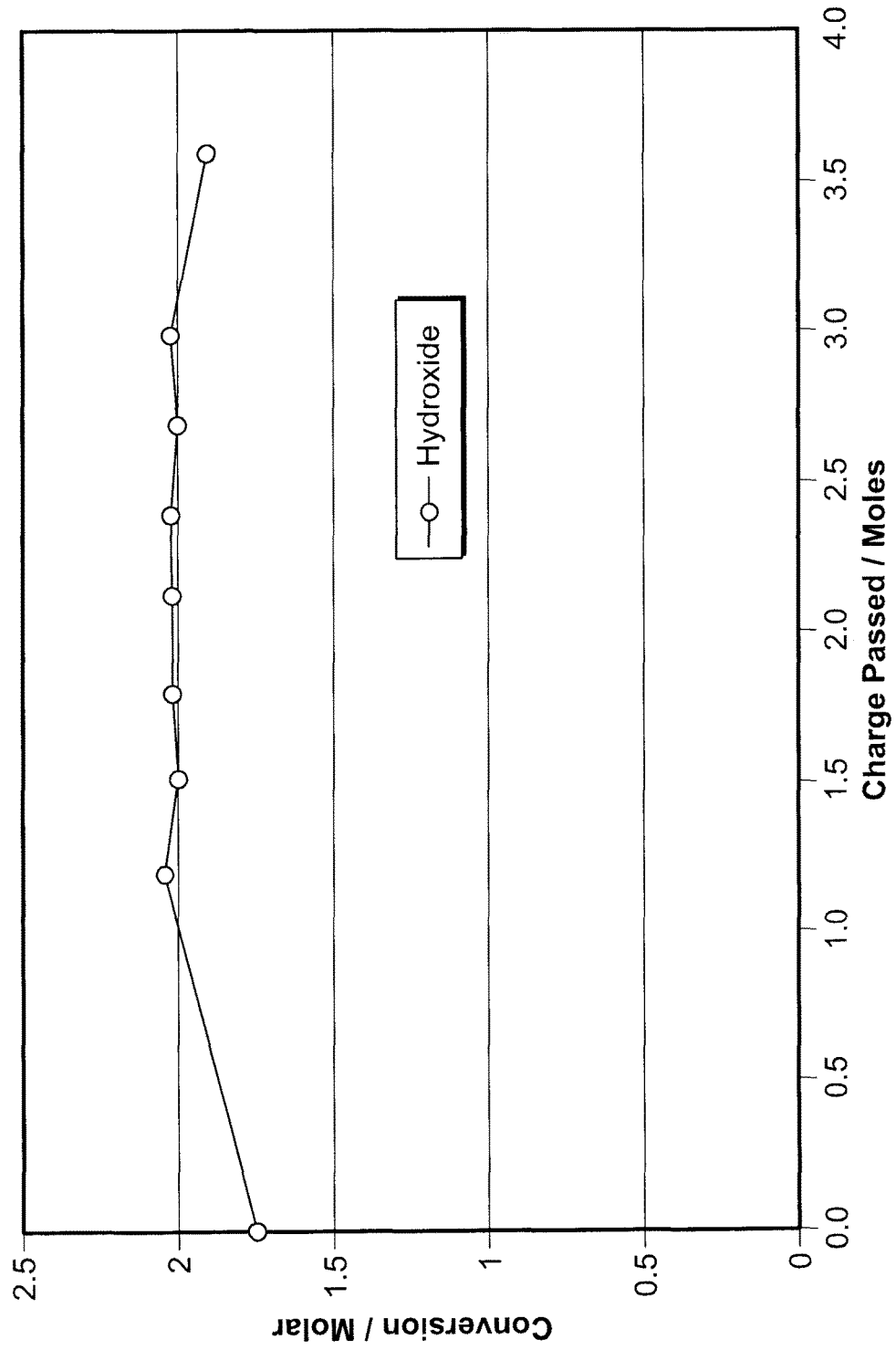

The voltage profile for the run using a current density of 4 kA/m² is shown in FIG. 4A. The voltage in most of the runs started high and decreased as the run progressed. In FIG. 4A, the hydroxide concentration increased from about 1.9 M to about 2.4 M over the course of the run, which decreased the voltage drop in the catholyte compartment.

The ICI FM-01 cell as built had about a 7 mm electrode/membrane gap. In a larger commercial cell where the gap can be decreased to about 2 mm, it is estimated that the overall cell voltage would be between about 4.5-5 V when using a catholyte solution that is an about 3 M aqueous solution comprising lithium hydroxide. Therefore, the power consumption for a two-compartment membrane electrolysis process running at a current density of about 4 kA/m² would be about 7 kWh/kg (LiOH in 3 M solution). This is comparable to the power observed to be required for a three-compartment cell coproducing ammonium sulfate except that process was only running at a current density of about 1.5 kA/m².

If a two-compartment cell was utilized to convert about 40% of the lithium sulfate in an about 3 tonne/hour LiOH plant, the cell area running at a current density of about 400 mA/cm² would be about 430 m². The remaining about 60% of the lithium sulfate can then be processed by a three-compartment cell, as discussed herein. Cell area estimates will be discussed further hereinbelow after discussion of the three-compartment work.

Example 2

Three-compartment Membrane Electrolysis Cell Trials with Converted Lithium Sulfate/Lithium Bisulfate The two-compartment work is useful for producing lithium hydroxide from lithium sulfate solution to an about 40% conversion. As the amount of process solution available was small, two initial runs were performed with synthetically made lithium bisulfate/sulfate solutions in order to properly define conditions for the test. The end solutions from the two-compartment work were remixed, and adjusted to an about 42% converted solution by addition of some lithium hydroxide. In order to remove possible hydroxide concentration effects, the lithium hydroxide concentration was dropped to about 2 M.

A. N324/AHA Three-Compartment Cell to Produce Ammonium Sulfate

The three-compartment cell used in previous studies (U.S. 61/636,869; U.S. 61/755,151; U.S. 61/788,292; PCT/CA2013/000398) was reused for the test work of the present studies and contained a Nafion N324 cation exchange membrane and an Astom AHA anion exchange membrane. FIGS. 6A-D are plots relating to this experiment. The results of the experiment using the three-compartment cell coproducing ammonium sulfate and aspects of this process are discussed in this section.

The start solution which contained about 1.64 M LiHSO₄ and about 0.2 M Li2SO4 (i.e. about 85% bisulfate) was run in the cell at a current density of about 200 mA/cm² with removal of the lithium sulfate producing lithium/sodium hydroxide in the catholyte and ammonium sulfate in the anolyte (ammonia was added to the feed under pH control). Water was transported from the feed but additional water was added to the anolyte and catholyte in order to substan-

TABLE 1

Characteristics for two-compartment runs with lithium sulfate feed.

Figure 6A:
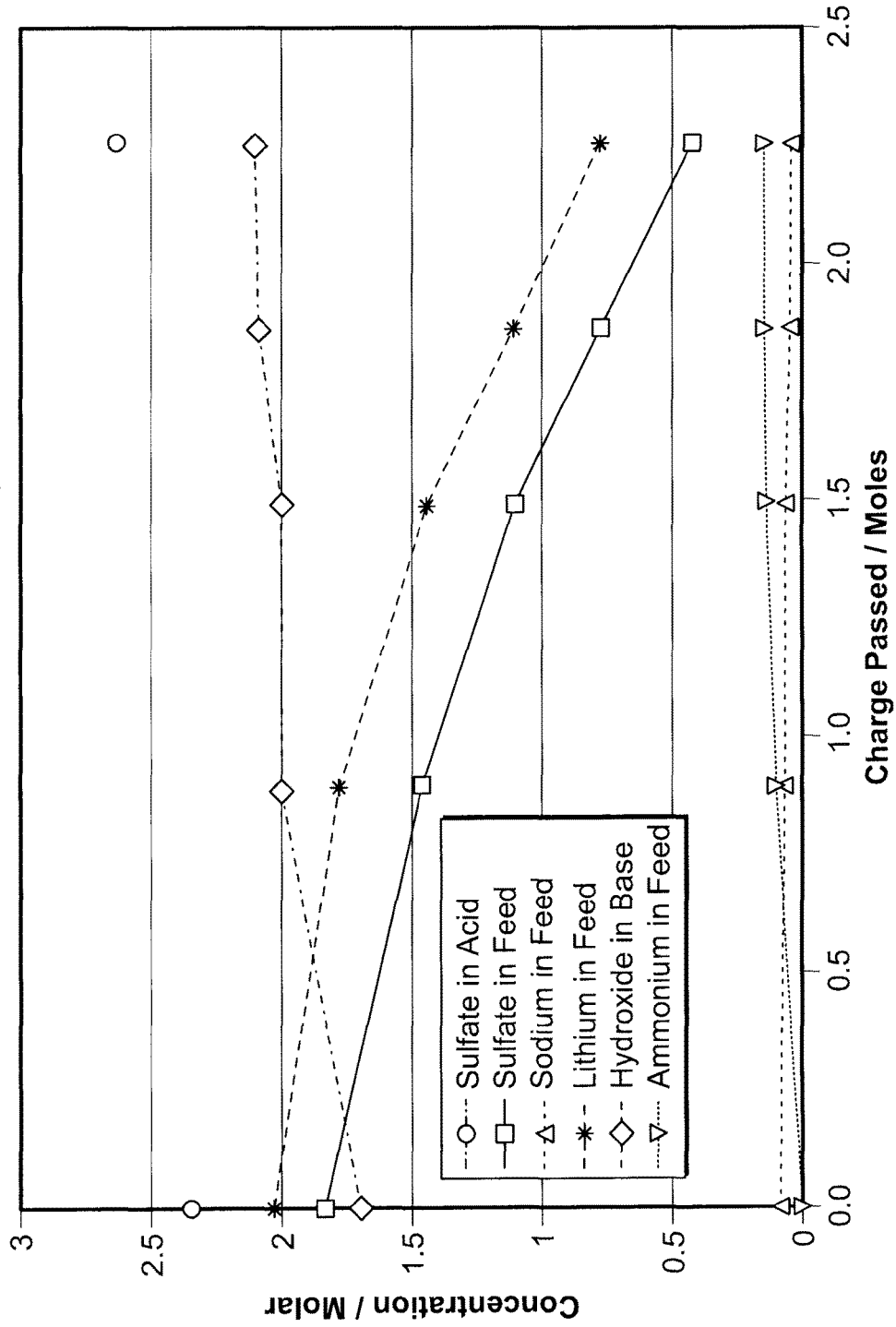
Figure 7A:
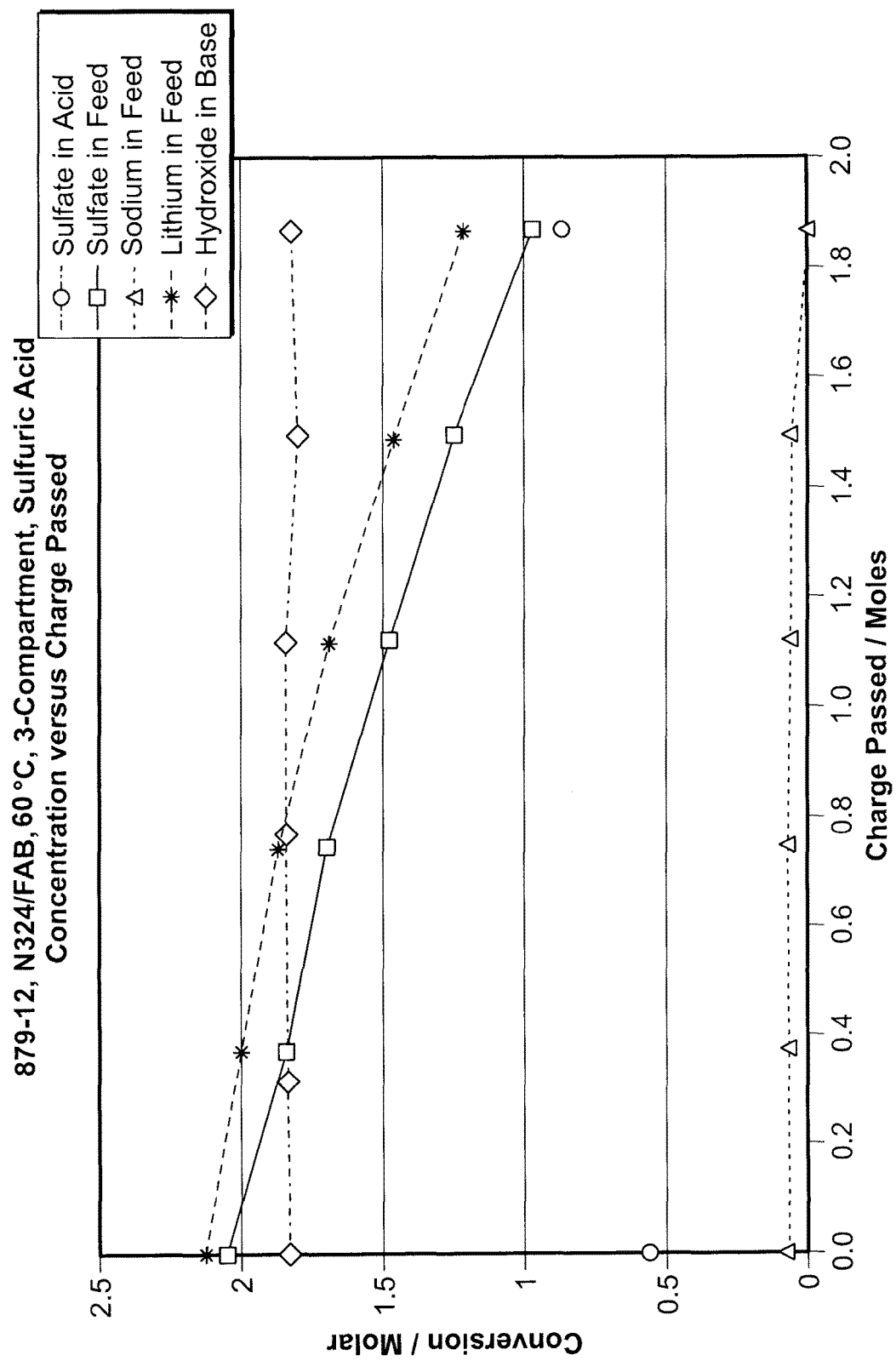
Figure 7B:
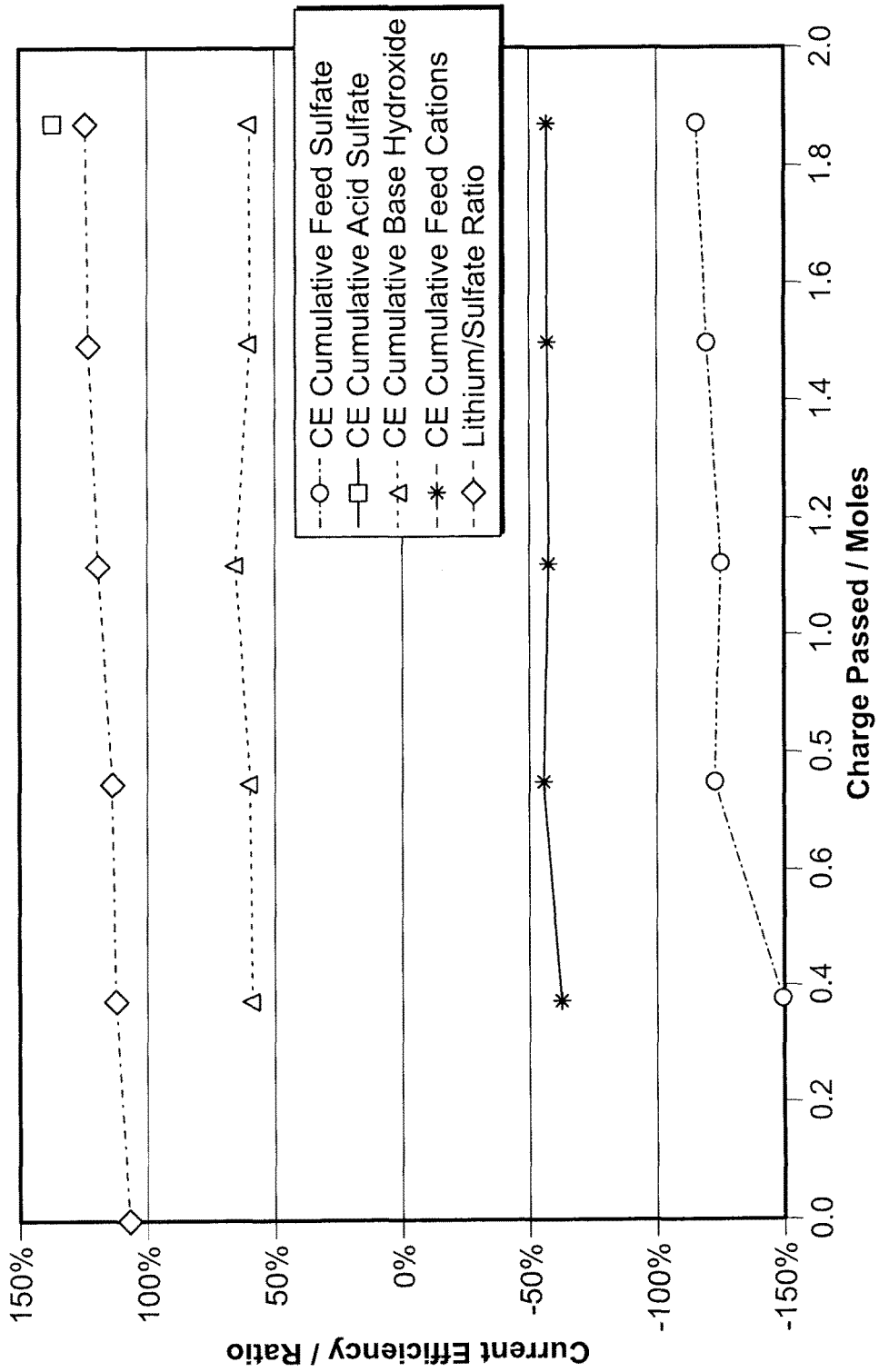
Figure 7C:
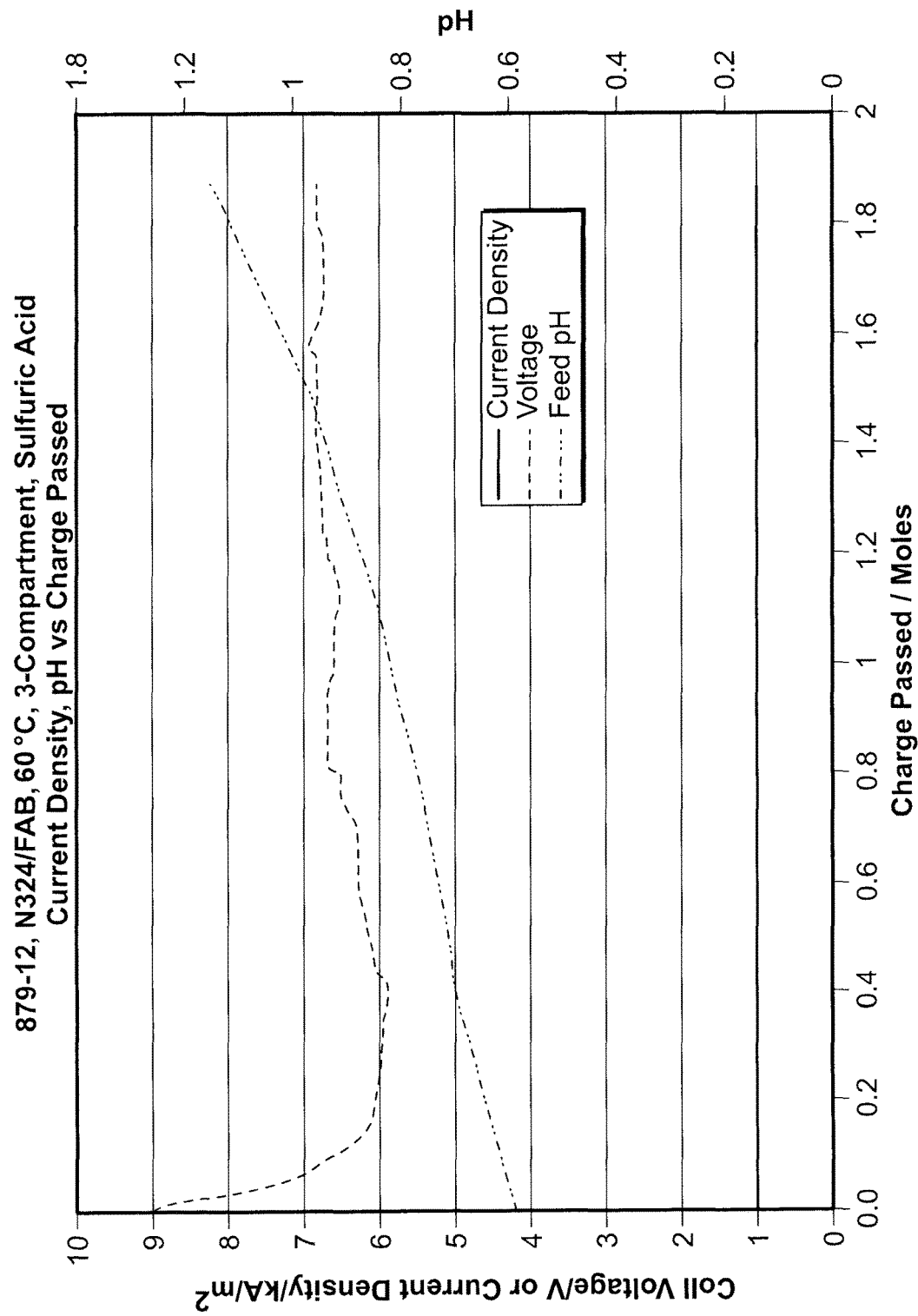
Figure 7D:
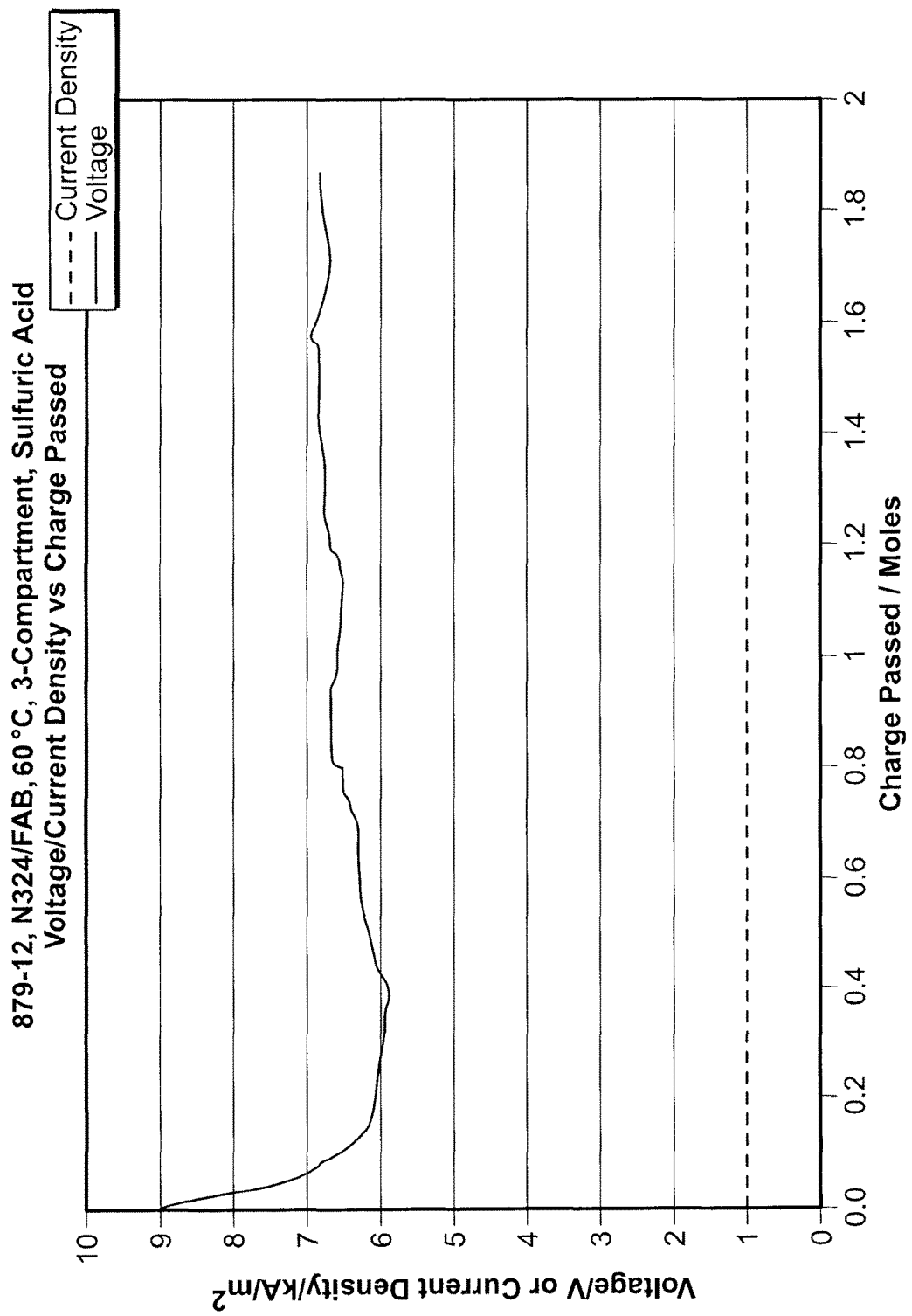

| Experiment No. | Current Density (kA/m²) | Voltage Range (V) | FEED [SO₄²⁻] (M) | [Li⁺] (M) | [Na⁺] (M) | BASE [OH⁻] (M) | Hydroxide (CE) | At % Conversion | Water Transport (mol H₂O/molQ) Feed | Base |
|---|---|---|---|---|---|---|---|---|---|---|
| 856-96 | 3 | 5.9-6.8 | 1.7-2.3 | 3.3-2.1 | 0.2-0.1 | 1.9-2.4 | 82% | 35-45 | −3.6 | 4.6 |
| 856-99 | 4 | 6.5-8.3 | 1.7-2.3 | 3.3-2.0 | 0.2-0.1 | 1.8-2.3 | 75% | 42-46 | −5.0 | 4.6 |
| 879-1 | 5 | 7.1-9.4 | 1.7-2.5 | 3.2-1.8 | 0.2-0.1 | 1.8-2.0 | 78% | 47-51 | −4.6 | 4.6 | tially maintain concentrations as shown in FIG. 6A. The experiment was run with about 93% removal of the sulfate from the feed.

Figure 6B:
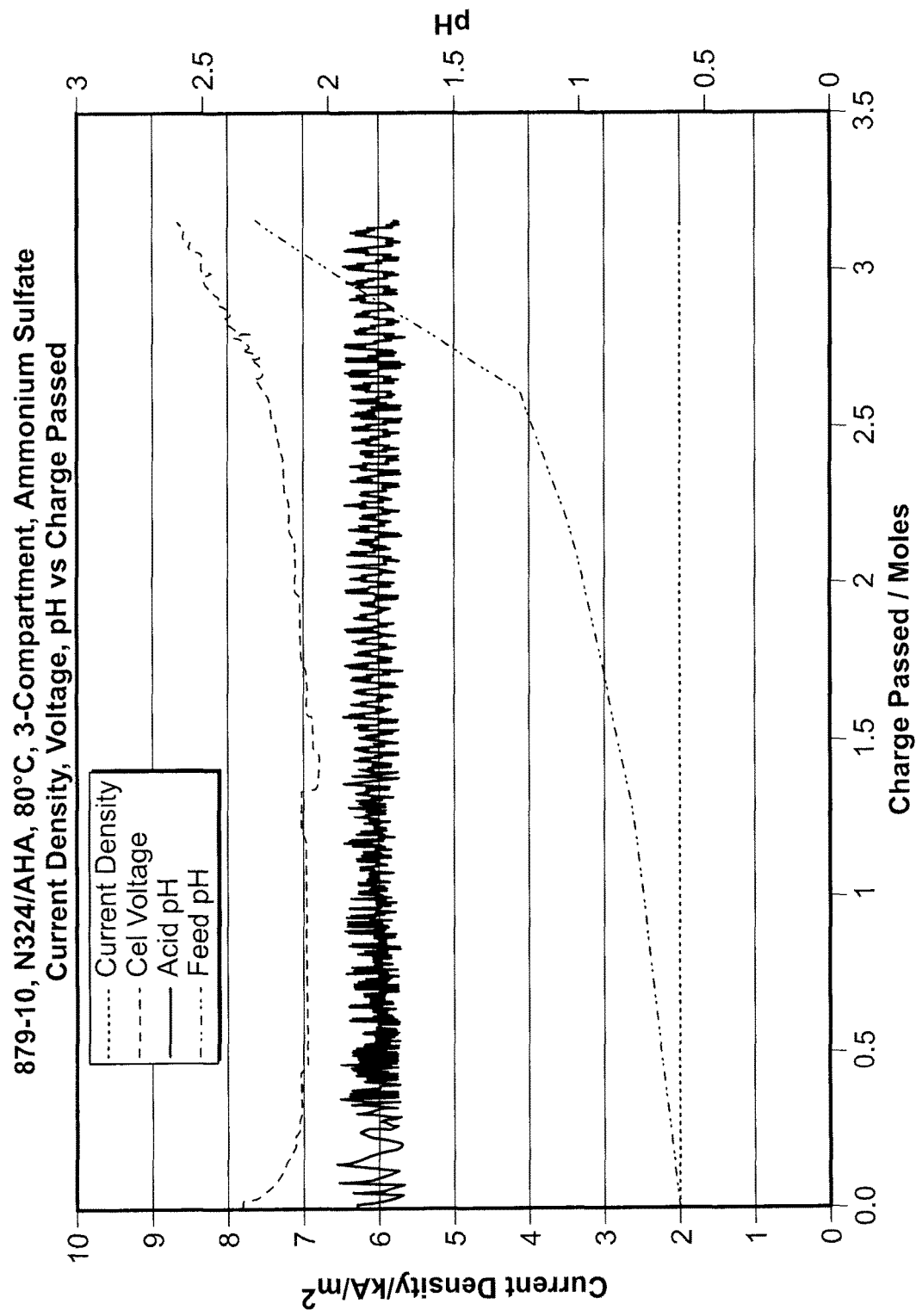

During the course of the run, the feed pH (which started at about 0.6) increased as sulfate was removed more efficiently than lithium reaching just over about 2 by the end of the experiment as shown in FIG. 6B. As such, the percentage of bisulfate in the feed decreased throughout the run until most of the solution was present as sulfate. The cell voltage was fairly constant at about 7 V until near the end of the run, where the feed started to be depleted.

Figure 6C:
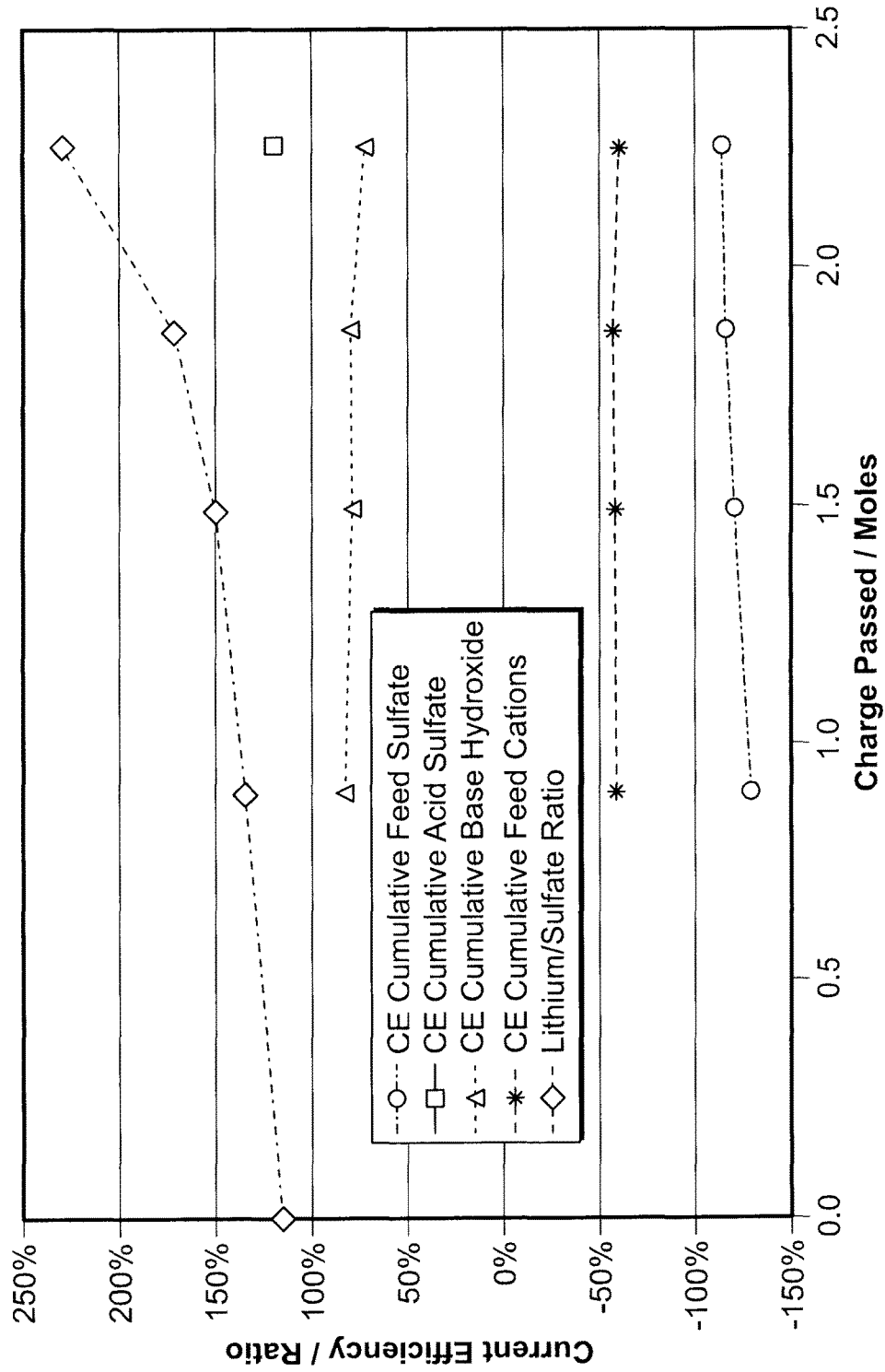
Figure 6D:
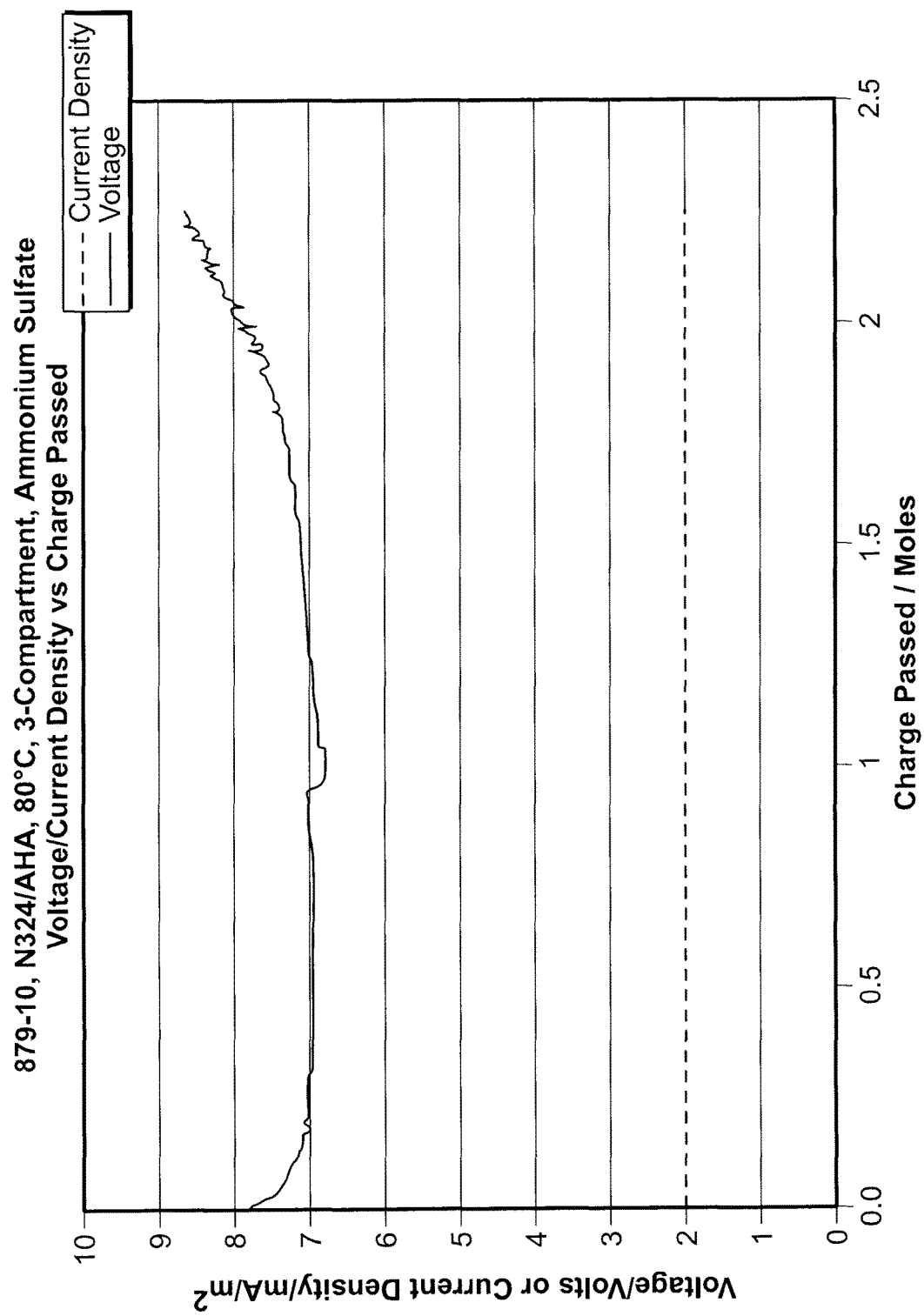

The current efficiencies measured for the various compartments are shown in FIG. 6C which verifies more efficient sulfate removal. The hydroxide production efficiency was about 72% while sulfate removal was about 114%. The higher than 100% sulfate removal is due to the calculation assuming the "sulfate" is transported as sulfate ($SO_4^{2-}$) through the membrane whereas, at these pH's, some of the transport must be as bisulfate ($HSO_4^-$).

B. N324/FAB Three-Compartment Cell to Produce Sulfuric Acid

The three-compartment electrochemical cell was rebuilt replacing the Astom AHA membrane with a new piece of Fumatech FAB membrane and similar tests were performed producing sulfuric acid in the anolyte. FIGS. 7A-D are plots relating to this experiment. The results of the experiment using the three-compartment cell coproducing sulfuric acid and aspects of this process are discussed in this section.

In this experiment, more water was added to the anolyte to keep the sulfuric acid strength below about 0.8 M as shown in FIG. 7A. Similar trends in current efficiencies (FIG. 7B) and feed pH (FIG. 7C) were observed. In this case only about 73% of the sulfate was removed as a lower current density (about 100 mA/cm$^2$) was used and less conversion occurred over the experimental run than the experiment discussed in Example 2, section A.

Although the current density for this test was half that of the previous test, a similar cell voltage was obtained. While not wishing to be limited by theory, this was mostly due to the high resistance of the FAB membrane.

The hydroxide current efficiency in these tests was lower by about 10%-15% in comparison to previous studies (U.S. 61/636,869; U.S. 61/755,151; U.S. 61/788,292; PCT/CA2013/000398). The cell was taken apart and a tear in the N324 membrane was observed. The tear was in the gasket area and should not have caused a problem. While not wishing to be limited by theory, the tear may have been formed by slight deformation of the plastic frames (at the higher temperature) with multiple rebuilds. A new run was performed with a new piece of N324 membrane and the current efficiency improved slightly. A final run was performed replacing the lithium bisulfate/sulfate solution with a higher pH lithium sulfate solution, and the current efficiency improved close to normal. While not wishing to be limited by theory, the lower feed pH seems to affect the three-compartment production. The current efficiency did not noticeably increase as the feed pH increased, which would have been expected.

While not wishing to be limited by theory, calcium in the feed can also cause loss of efficiency as known, for example in the chlor-alkali industry.

It was thus shown that processes incorporating a combination of two-compartment and three-compartment membrane electrolysis cells are useful to convert lithium sulfate to lithium hydroxide. The two-compartment cell is efficient at making hydroxide until about 40% conversion. The present testing also showed that a decrease in current efficiency for hydroxide production of between about 10-15% occurred when the resulting solution was processed in a three-compartment cell. Processes which co-produced either ammonium sulfate or sulfuric acid were observed to behave similarly for hydroxide formation.

Processing about 40% of the lithium value in a two-compartment cell significantly decreases the total cell area required for production of 3 tonnes per hour of LiOH. Power cost would be similar for this process as the two-compartment cell is operated at a higher current density of about 400 mA/cm$^2$. It would be appreciated by a person skilled in the art that using a lower current density would decrease the power, but increase the cell area required.

TABLE 2

Cell Area and Power for the Various Processes

| Process (current density) | Cell Area (m$^2$) | Power[1] |
|---|---|---|
| Sulfuric acid (1 kA/m$^2$) | 4500 | 8.9 |
| Ammonium sulfate (1.5 kA/m$^2$) | 2850 | 6.4 |
| Two-compartment (4 kA/m$^2$) then sulfuric acid (1 kA/m$^2$) | 430 (2 compartment) ~2700 (3 compartment) | 8.1 |
| Two-compartment (4 kA/m$^2$) then ammonium sulfate (1.5 kA/m$^2$) | 430 (2 compartment) ~1700 (3 compartment) | 6.6 |

[1]kWh/kg LiOH in 3M solution.

Benefits to the present system are obtained, for example due to the high current density utilized in the two-compartment cell. However, it will be appreciated by a person skilled in the art that at these current densities, the lifetime of the DSA-$O_2$ anode decreases.

The lower current efficiency for hydroxide production obtained in the process of the present studies would increase the cell area slightly for the three-compartment process. However, this inefficiency assumes sequential processing of the solutions where solution is fed from the two-compartment system to a separate system running the three-compartment cells. Alternatively, both types of cells could be run off of the same solution and therefore the process could be run at any pH required and the pH of the solution could be increased or decreased, for example by changing the percentage processed by one cell or the other. For example, if pH needs to be decreased, the current density of the two-compartment cell could be increased and/or the three-compartment cell could be decreased. In the case of sulfuric acid generation with the Fumatech FAB membrane, the pH would be controlled at around 1.5, for example to keep the FAB membrane conductive and minimize proton transport.

In the case of ammonium sulfate production with Astom AHA, one of the issues reported in previous studies was stopping the feed pH from increasing as the caustic current efficiency was much lower than the sulfate removal. The two-compartment cell used in the present processes could be used to maintain the overall feed pH at a much lower pH.

The combination of the two processes (i.e. the two-compartment and three-compartment processes) may also allow better utilization of the feed solution as a larger amount of water is removed from the feed, possibility allowing for more continuous operation.

The present disclosure has been described with regard to specific examples. The description was intended to help the understanding of the disclosure, rather than to limit its scope. It will be apparent to one skilled in the art that various modifications can be made to the disclosure without departing from the scope of the disclosure as described herein, and such modifications are intended to be covered by the present document.

It was thus observed that the processes and systems of the present disclosure are effective for converting Li$_2$SO4 and/or LiHSO$_4$ into LiOH at low costs by using a high current efficiency and requiring a low total cell area. It was found that by combining a two-compartment monopolar or bipolar membrane electrolysis process and a three-compartment monopolar or bipolar membrane electrolysis process, such higher current efficiencies were possible, thereby leading to such an economy in terms of current and space All publications, patents and patent applications are herein incorporated by reference in their entirety to the same extent as if each individual publication, patent or patent application was specifically and individually indicated to be incorporated by reference in its entirety. Where a term in the present disclosure is found to be defined differently in a document incorporated herein by reference, the definition provided herein is to serve as the definition for the term.

What is claimed is:

1. A process for preparing lithium hydroxide, said process comprising:
submitting, in a first electrochemical cell that comprises a two-compartment membrane cell, an aqueous composition comprising lithium sulfate and/or lithium bisulfate to a first electromembrane process that comprises a two-compartment membrane process for conversion of said lithium sulfate and/or lithium bisulfate to lithium hydroxide, and obtaining a first lithium-reduced aqueous stream and a first lithium hydroxide-enriched aqueous stream;
monitoring conversion of said lithium sulfate and/or lithium bisulfate into lithium hydroxide such that when consumption of said lithium sulfate and/or lithium bisulfate reaches 30 to 50 weight %, conveying said first lithium-reduced aqueous stream from an anolyte compartment of said first electrochemical cell to a central compartment of a second electrochemical cell that comprises a three-compartment membrane cell; and
submitting said first lithium-reduced aqueous stream to a second electromembrane process that comprises a three-compartment membrane process to prepare at least a further portion of lithium hydroxide and obtaining a second lithium-reduced aqueous stream, sulfuric acid and a second lithium-hydroxide enriched aqueous stream.

2. The process of claim 1, wherein said first electromembrane process comprises a two-compartment monopolar or bipolar membrane electrolysis process.

3. The process of claim 2, wherein in said two-compartment monopolar or bipolar membrane electrolysis process, current density is maintained at a value of from 3 kA/m$^2$ to 5 kA/m2.

4. The process of claim 2, wherein said two-compartment monopolar or bipolar membrane electrolysis process is carried out in said first electrochemical cell comprising said anolyte compartment separated from a catholyte compartment by a cation exchange membrane.

5. The process of claim 4, wherein said cation exchange membrane comprises a perfluorinate sulfonic acid.

6. The process of claim 4, wherein during said two-compartment monopolar or bipolar membrane electrolysis process, said aqueous stream comprising lithium sulfate and/or lithium bisulfate is introduced into said anolyte compartment, said first lithium-reduced aqueous stream is removed from said anolyte compartment and said first lithium hydroxide-enriched aqueous stream is removed from said catholyte compartment.

7. The process of claim 6, wherein during said two-compartment monopolar or bipolar membrane electrolysis process, conversion of said lithium sulfate and/or lithium bisulfate to lithium hydroxide is carried out as long as hydroxide current efficiency is no longer maintained and when hydroxide current efficiency decreases, said two-compartment monopolar or bipolar membrane electrolysis process is stopped.

8. The process of claim 6, wherein during said two-compartment monopolar or bipolar membrane electrolysis process, conversion of said lithium sulfate and/or lithium bisulfate to lithium hydroxide proceeds until pH in said anolyte compartment is a value of from 0.4 to 1.0.

9. The process of claim 8, wherein in said catholyte compartment of said two-compartment monopolar or bipolar membrane electrolysis process, lithium hydroxide is maintained at a concentration of 2 M to 4 M.

10. The process of claim 6, wherein during said two-compartment monopolar or bipolar membrane electrolysis process, said aqueous stream comprising lithium sulfate and/or lithium bisulfate is introduced into said anolyte compartment at a temperature of 20 ° C. to 100 ° C.

11. The process of claim 6, wherein in said two-compartment monopolar or bipolar membrane electrolysis process, current density is maintained at a value of from 0.5 kA/m$^2$ to 6 kA/m$^2$.

12. The process of claim 11, wherein in said two-compartment monopolar or bipolar membrane electrolysis process, voltage is maintained at a value of 3 V to 8 V.

13. The process of claim 12, wherein said first electrochemical cell has an overall cell size of 200 m$^2$ to 2000 m$^2$.

14. The process of claim 6 wherein said process further comprises recycling at least a portion of said second lithium-reduced aqueous stream to said first electromembrane process.

15. The process of claim 14, wherein said second lithium-reduced aqueous stream is recycled to said first electrochemical cell when the pH in said central compartment of said second electrochemical cell reaches a value of 2 to 12.

16. The process of claim 15, wherein said second lithium-reduced aqueous stream is recycled to said first electrochemical cell in order to maintain pH of the first lithium-reduced aqueous stream above a value of 0.4 to 1.2.

17. The process of claim 14, wherein said second lithium-reduced aqueous stream is recycled to said first electrochemical cell when the pH in said central compartment of said second electrochemical cell reaches a value of 8 to 10.

18. The process of claim 17, wherein said second lithium-reduced aqueous stream is recycled to said first electrochemical cell in order to maintain pH of the first lithium-reduced aqueous stream above a value of 0.6.

19. The process of claim 14, wherein said second lithium-reduced aqueous stream is recycled to said first electrochemical cell in order to maintain pH of the first lithium-reduced aqueous stream above a value of 0.4 to 1.2.

20. The process of claim 6, wherein during said two-compartment monopolar or bipolar membrane electrolysis process, conversion of said lithium sulfate and/or lithium bisulfate to lithium hydroxide proceeds until pH in said anolyte compartment drops to a value of from 0.5 to 0.8.

21. The process of claim 1, wherein said process further comprises recycling at least a portion of said second lithium-reduced aqueous stream to said first electromembrane process.

* * * * *